(12) United States Patent  (10) Patent No.: US 7,934,368 B2
Müller et al.  (45) Date of Patent: May 3, 2011

(54) ULTRA-MICRO GAS TURBINE

(75) Inventors: Norbert Müller, Haslett, MI (US);
Florin Valeriu Iancu, Lansing, MI (US);
Pezhman Akbari, Indianapolis, IN (US)

(73) Assignee: Board of Trustees of Michigan State University, East Lansing, MI (US)

( * ) Notice: Subject to any disclaimer, the term of this patent is extended or adjusted under 35 U.S.C. 154(b) by 1119 days.

(21) Appl. No.: 11/631,923

(22) PCT Filed: Jul. 7, 2005

(86) PCT No.: PCT/US2005/024290
§ 371 (c)(1),
(2), (4) Date: Jan. 8, 2007

(87) PCT Pub. No.: WO2006/083320
PCT Pub. Date: Aug. 10, 2006

(65) Prior Publication Data
US 2008/0041065 A1  Feb. 21, 2008

Related U.S. Application Data

(60) Provisional application No. 60/586,991, filed on Jul. 9, 2004, provisional application No. 60/627,742, filed on Nov. 12, 2004.

(51) Int. Cl.
*F02G 1/00* (2006.01)
*F02G 3/00* (2006.01)
(52) U.S. Cl. ............... 60/39.45; 60/39.34; 60/39.35
(58) Field of Classification Search ............. 60/39.45, 60/39.34, 39.35
See application file for complete search history.

(56) References Cited

U.S. PATENT DOCUMENTS

| | | | |
|---|---|---|---|
| 5,267,432 | A | 12/1993 | Paxson |
| 5,297,384 | A | 3/1994 | Paxson |
| 5,464,325 | A | 11/1995 | Albring et al. |
| 5,874,798 | A | 2/1999 | Wiegele et al. |
| 5,894,719 | A | 4/1999 | Nalim et al. |
| 5,916,125 | A | 6/1999 | Snyder |
| 5,932,940 | A | 8/1999 | Epstein et al. |
| 6,351,934 | B2 | 3/2002 | Snyder |
| 6,449,939 | B1 | 9/2002 | Snyder |
| 6,460,342 | B1 | 10/2002 | Nalim |
| 6,526,936 | B2 | 3/2003 | Nalim |
| 6,747,338 | B1 | 6/2004 | Nunan et al. |

(Continued)

OTHER PUBLICATIONS

"Smart Efficient Components", Nasa Glenn Research Center, http://www.grc.nasa.gov/WWW/AERO/base/sec.htm, Jul. 6, 2004, 6 pages.

(Continued)

*Primary Examiner* — Michael Cuff
*Assistant Examiner* — Young Choi
(74) *Attorney, Agent, or Firm* — Harness, Dickey & Pierce, P.L.C.

(57) ABSTRACT

The present invention provides an ultra micro gas turbine engine which includes a wave rotor. In various embodiments, the ultra micro gas turbine engine of the present invention includes a rotating disk which has a compressor, a wave rotor and a turbine, a first stationary member which includes an inlet and a first wave rotor port end plate, a second stationary member which includes an outlet and a second wave rotor port end plate and a combustion chamber which includes a fuel inlet and an igniter.

90 Claims, 12 Drawing Sheets

U.S. PATENT DOCUMENTS

| | | | |
|---|---|---|---|
| 6,866,478 | B2 | 3/2005 | Fabian et al. |
| 7,555,891 | B2* | 7/2009 | Muller et al. ............. 60/39.45 |
| 2008/0000238 | A1* | 1/2008 | Ribaud et al. ............. 60/804 |

OTHER PUBLICATIONS

A. Epstein et al., "Shirtbutton-Sized Gas Turbines: The Engineering Challenges of Micro High Speed Rotating Machinery", 8th Int'l Symposium on Transport Phenomena and Dynamics of Rotating Machinery (ISROMAC'8) Jan. 2000, 10 pages.

A. Epstein, "Millimeter-Scale, Micro-Electro-Mechanical Systems Gas Turbine Engines", ASME J. Eng. Gas Turbine Power, vol. 126, Apr. 2004, pp. 205-226.

A. Mehra et al., "A Six-Wafer Combustion System for a Silicon Micro Gas Turbine Engine", J. Microelectromech, Sys. vol. 9, No. 4, Dec. 2000, pp. 517-527.

F. Iancu et al., "Feasibility Study of Integrating Four-Port Wave Rotors into Ultra-Micro Gas Turbines (UµGT)", XP-002391768, 20th AIAA/ASME/SAE/ASEE Joint Propulsion Conference and Exhibit Jul. 11-14, 2004, pp. 1-12.

K. Okamoto et al., "A Simple Numerical Approach of Micro Wave Rotor Gasdynamic Design", ISABE-2003-1213, American Institute of Aeronautics and Astronautics Inc., 2003, 8 pages.

L. Frechette et al., "Design of a Microfabricated Rankine Cycle Steam Turbine for Power Generation", IMECE2003-42082, ASME Int'l Mech. Eng. Congress & Expo., Nov. 16-21, 2003, pp. 1-10.

L. Frechette et al., "Preliminary Design of a MEMS Steam Turbine Power Plant-on-a-Chip", 3rd Int'l. Workshop of Micro & Nano Tech. for Power Generation & Energy Conv., Dec. 4-5, 2003, pp. 1-4.

M. Schmidt, "Portable MEMS Power Sources", 2003 IEEE International Solid-State Circuits Conference, ISSCC/Section 22/TD: Embedded Technologies/Paper 22.5, 8 pages.

N. Müller et al., "Optimization and Design Guidelines for High Flux Micro-Channel Heat Sinks for Liquid and Gaseous Single-Phase Flow", 2002 Inter Society Conference on Thermal Phenomena, pp. 449-456.

N. Müller et al., "Performance Analysis of Brayton and Rankine Cycle Microsystems for Portable Power Generation", ASME Int'l Mech. Eng. Congress & Expo., Nov. 17-22, 2002, pp. 1-10.

N. Müller, "Design of Compressor Impellers for Water as a Refrigerant", ASHRAE Transactions: Research, vol. 107, 2001, pp. 214-222.

N. Müller, "Ein Schneller Algorithmus für Entwurf und Berechnung von Laufrädern mit Radialfaserschaufeln", in Klingenberg J., Heller W.: Beiträge zur Strömungsmechanik Tu Desden, 2001, pp. 235-244.

N. Müller, "Turbo Chillers Using Water as a Refrigerant", ASME Process Industry Division PID Newsletter, Fall 2002, p. 3.

P. Akbari et al., "A Review of Wave Rotor Technology and its Applications", IMECE2004-60082, ASME International Mechanical Engineering Congress Nov. 13-18, 2004, pp. 1-15.

P. Akbari et al., "Gas Dynamic Design Analyses of Charging Zone for Reverse-Flow Pressure Wave Superchargers", ICES2003-690, Spring Technical Conference of the ASME International Combustion Engine Division, May 11-14, 2003, (© 2002), pp. 1-11.

P. Akbari et al., "Performance Improvement of Small Gas Turbines Through Use of Wave Rotor Topping Cycles", GT2003-38772, ASME Turbo Expo 2003 Power for Land, Sea and Air Jun. 16-19, 2003, (© 2002), pp. 1-11.

R. Ghodssi et al., "Thick Buried Oxide in Silicon (TBOS): An Integrated Fabrication Technology for Multi-Stack Wafer-Bonded MEMS Processes", 10th International Conference on Solid-State Sensors and Actuators, Jun. 7-10, 1999, pp. 1-12.

S. Ashley, "Turbines on a Dime", XP-000727170, Mechanical Engineering, Oct. 1997, pp. 78-81.

Yves Ribaud et al., "Micropropulsion Microcombustion", http//:www.onera.fr/conferences/micropropulsion/index.html, Jun. 28, 2005, 5 pages.

P. Akbari et al.; "A Review Of Wave Rotor Technology And Its Applications;" Proceedings of IMECE04, 2004 ASME International Mechanical Engineering Congress, Anaheim, California, IMECE2004-60082, Nov. 13-19, 2004; pp. 1-23.

T. Nagashima et al.; "Cycles and Thermal System Integration Issues of Ultra-Micro Gas Turbines;" Micro Gas Turbines, Educational Notes RTO-EN-AVT-131, Paper 4 (2005); pp. 4-1-4-66.

F. Iancu et al.; "Efficiency of Shock Wave Compression in a Microchannel;" Microfluid Nanofluid (2005); 14 pages.

F. Iancu et al.; "Design and Fabrication of Microchannel Test Rig for Ultra-Micro Wave Rotors;" Microsyst Technol (2007); 10 pages.

P. Akbari et al.; "Performance Enhancement of Microturbine Engines Topped With Wave Rotors;" Journal of Engineering for Gas Turbines and Power, vol. 128 (Jan. 2006); pp. 190-202.

P. Akbari et al.; "A Review of Wave Rotor Technology and Its Applications;" Journal of Engineering for Gas Turbines and Power; vol. 128 (Oct. 2006); pp. 717-735.

J. Bryzek; "162: Principles of MEMS;" Handbook of Measuring System Design (2005); pp. 1-6.

* cited by examiner

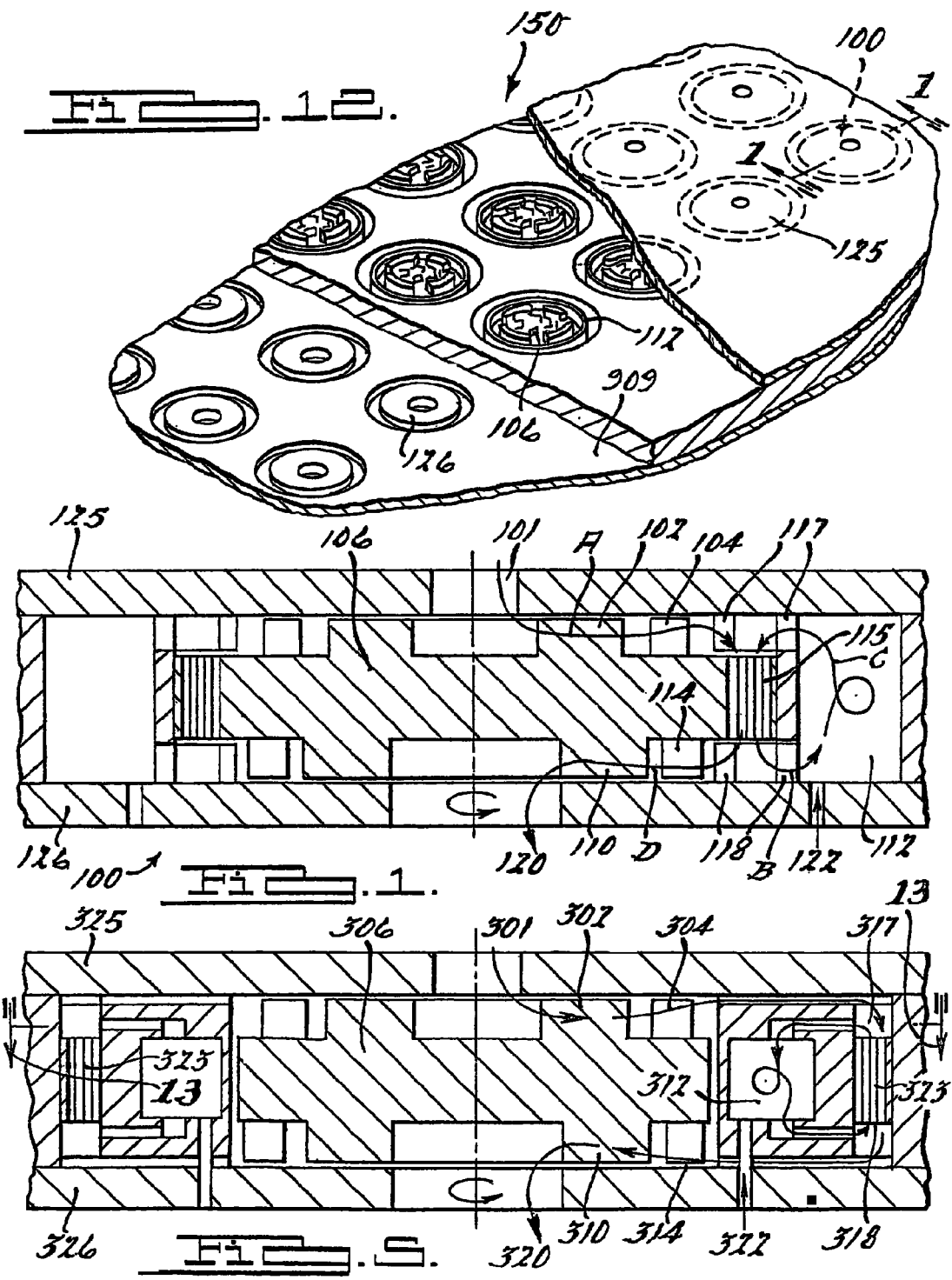

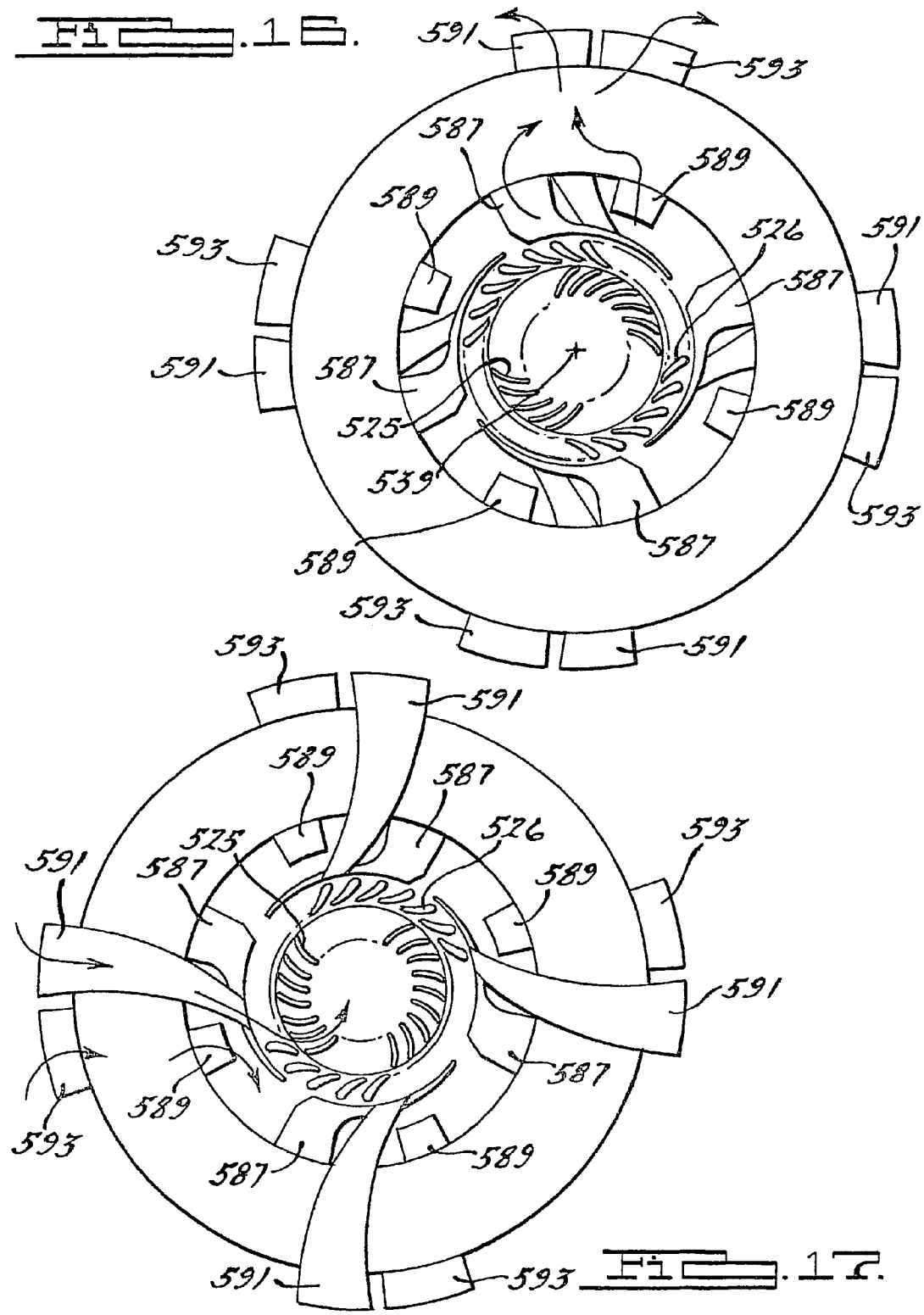

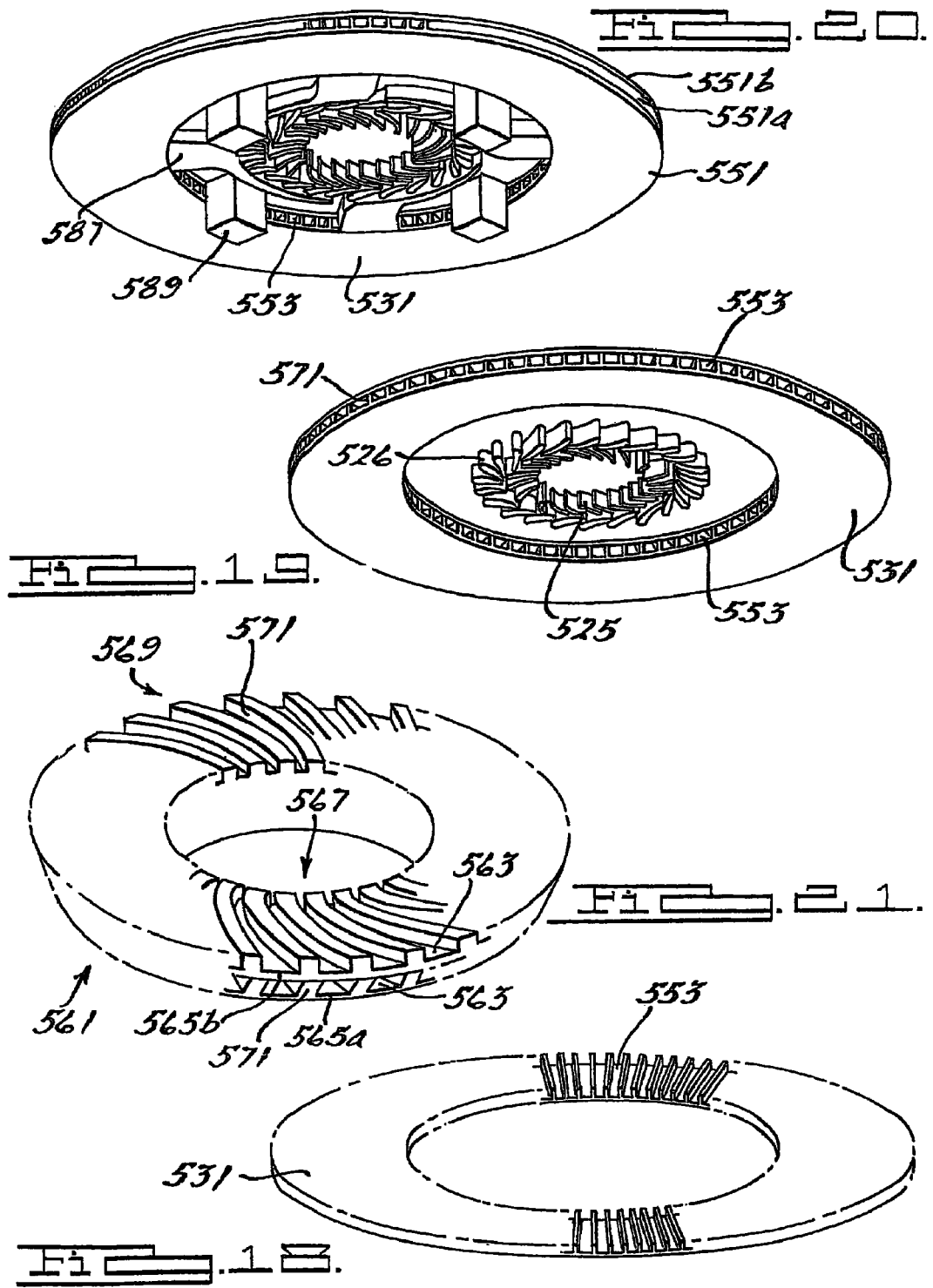

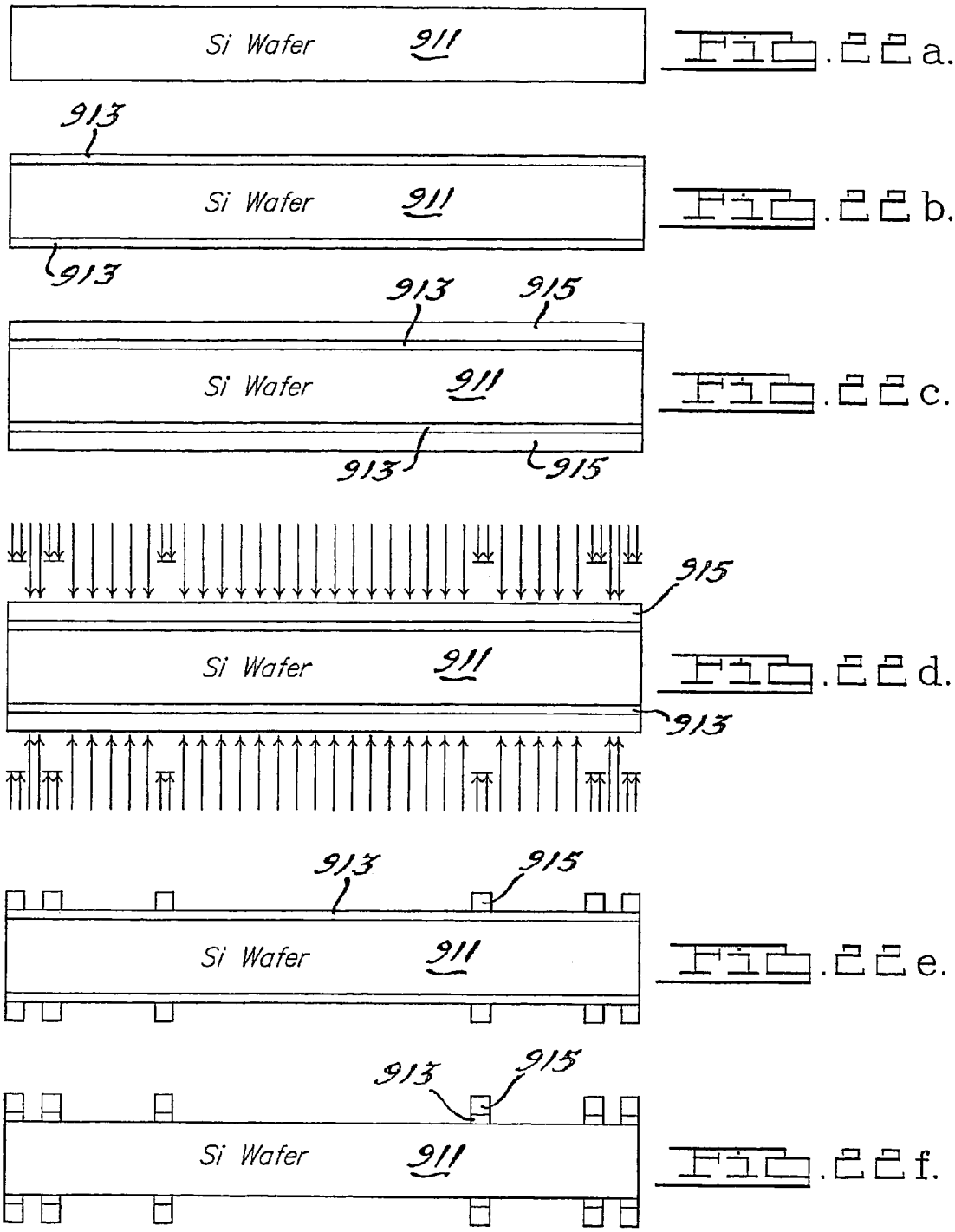

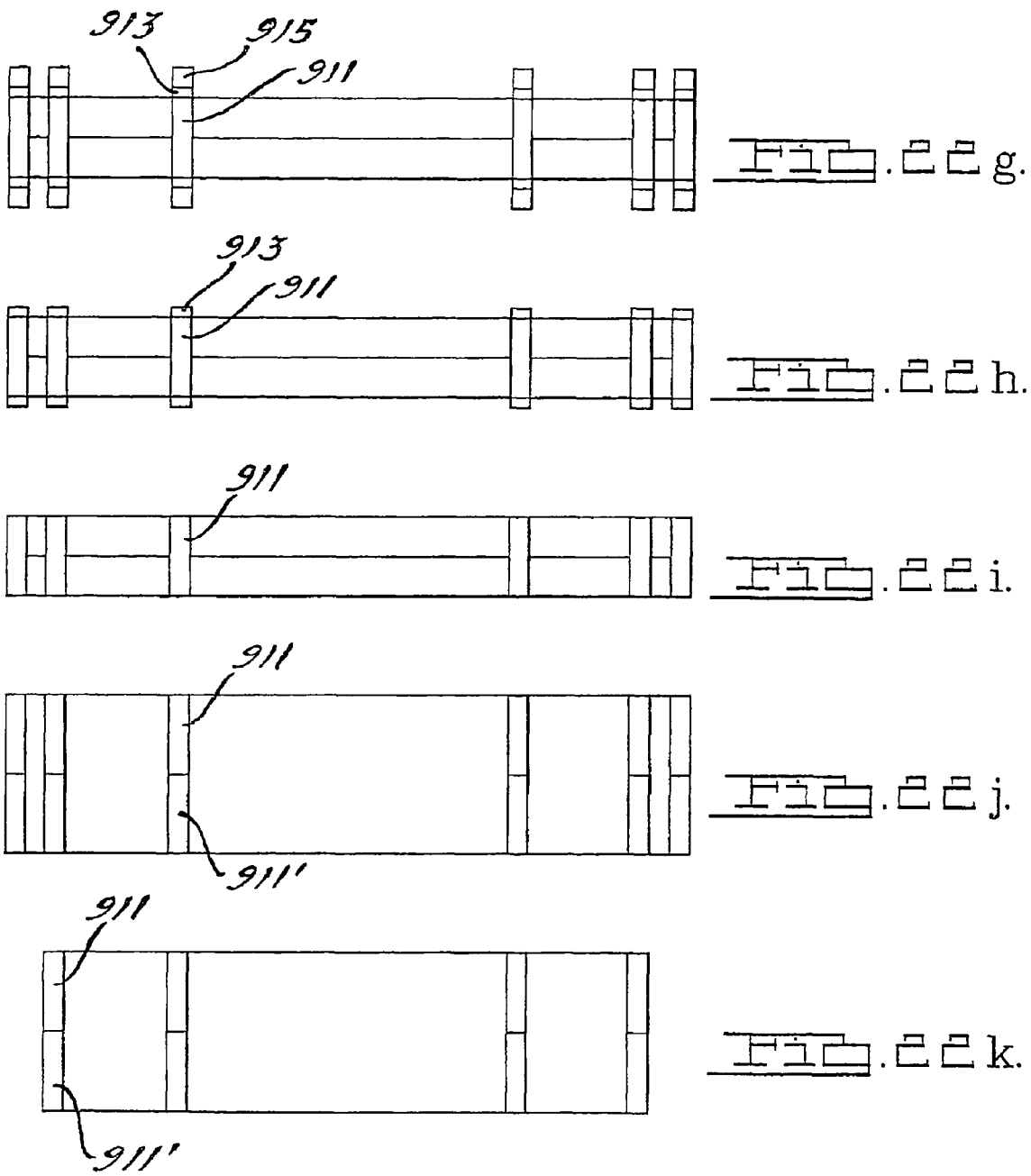

ably apparent that the examples may be embod-

ULTRA-MICRO GAS TURBINE

CROSS REFERENCE TO RELATED APPLICATIONS

The present application claims priority to U.S. provisional patent application Ser. No. 60/586,991, filed Jul. 9, 2004, and U.S. provisional patent application Ser. No. 60/627,742, filed Nov. 12, 2004, both of which are incorporated by reference herein.

FIELD OF THE INVENTION

The present invention relates to gas turbine engines, both apparatuses and methods of use, and more specifically, to ultra micro gas turbine engines.

BACKGROUND OF THE INVENTION

Gas turbine engines are essentially simple devices having only three parts: a compressor, a combustion area, and a turbine. Applications of such engines are well known, for example, in jet engines on commercial and military aircraft, the propulsion system for M-1 tanks, and small industrial power plants. Depending on the application of the gas turbine engine, the turbine can be used to produce thrust, rotate a drive shaft, or rotate a generator to produce electricity. Devices such as wave rotors have been used in an attempt to improve the efficiency and the output of gas turbine engines. Most applications of gas turbine engines are very large in scale and not until recent innovations in mechanical and electrical manufacturing systems, and nanotechnology, have gas turbine engines been able to be produced in a smaller scale. Although gas turbine engines may be produced at a micro scale, such engines are not efficient and are not very typical.

A known micro wave rotor configuration is briefly disclosed in K. Okamoto and T. Nagashima, "A Simple Numerical Approach of Micro Wave Rotor Gasdynamic Design," *American Institute of Aeronautics and Astronautics*, ISABE 2003-1213 (2003). It is believed that this axial configuration has a wave rotor channel length of about 6.9 centimeters or greater. The intended manufacturing techniques for the Okamoto design, however, are not disclosed in this publication. Therefore, what is needed is a device and methods that will improve the efficiency and practicality of micro scale gas turbine engines. Furthermore, a device and methods that will improve the efficiency and practicality of micro scale gas turbine engines would be desirable.

SUMMARY OF THE INVENTION

In accordance with the present invention, a new approach in increasing the efficiency of a micro scale turbine engine apparatus is provided. In another aspect of the present invention, an ultra micro gas turbine engine includes a wave rotor. In various embodiments, an ultra micro gas turbine engine of the present invention includes a rotating disk which has a compressor, a wave rotor and a turbine, a first stationary member which includes an inlet and a first wave rotor port end plate, a second stationary member which includes an outlet and a second wave rotor port end plate and a combustion chamber which includes a fuel inlet and an igniter. Also provided are methods of microfabrication of an ultra micro gas turbine engine employed with other aspects of the present invention. An additional aspect of the present invention allows ultra micro gas turbine engines to be manufactured from materials that include silicon. In addition, a further aspect of the present invention provides a wave rotor with cells that are less than 1 cm in length.

The ultra micro gas turbine apparatus of the present invention is advantageous over conventional devices in that the present invention is expected to significantly improve efficiency, lower internal flow velocity, use shock wave compression and achieve reliability through redundancy while being extremely small in size. It is also believed that the present invention provides realistic, predictive modeling. The microfabricating processes employed with the present invention allow for a significant size reduction over conventional casting, drilling and machining methods. The ultra micro size of the present apparatus and its extremely small wave rotor channel lengths are ideally suited for use in ultra micro gas turbines, which leads to improved cycle efficiencies. Furthermore, the mirofabricated wave rotor of the present invention should be considerably more efficient than a microfabricated compressor, for example. Further advantages and areas of applicability of the present invention will become apparent from the detailed description and appended drawings provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a cross-sectional view showing a second alternate embodiment of the present invention apparatus;

FIG. 6 is a cross-sectional view showing a third alternate embodiment of the present invention apparatus;

FIG. 7 is a top elevational view showing the first alternate embodiment apparatus of FIG. 2;

FIG. 12 is a fragmentary, perspective view showing an array of ultra micro gas turbine engines of any of the alternate embodiments of the present invention apparatus;

FIG. 16 is a top elevational view showing the first preferred embodiment apparatus of the present invention;

FIG. 17 is a bottom elevational view showing the first preferred embodiment apparatus of the present invention;

FIGS. 18-20 are a series of perspective views showing various components employed in the first preferred embodiment apparatus of the present invention;

FIG. 21 is a perspective view showing a second preferred embodiment radial compressor employed in the present invention apparatus;

FIGS. 22a-22k are a series of diagrammatic views showing preferred manufacturing steps employed in any of the embodiments of the present invention apparatus.

DETAILED DESCRIPTION OF THE PREFERRED EMBODIMENTS

Figure 1:
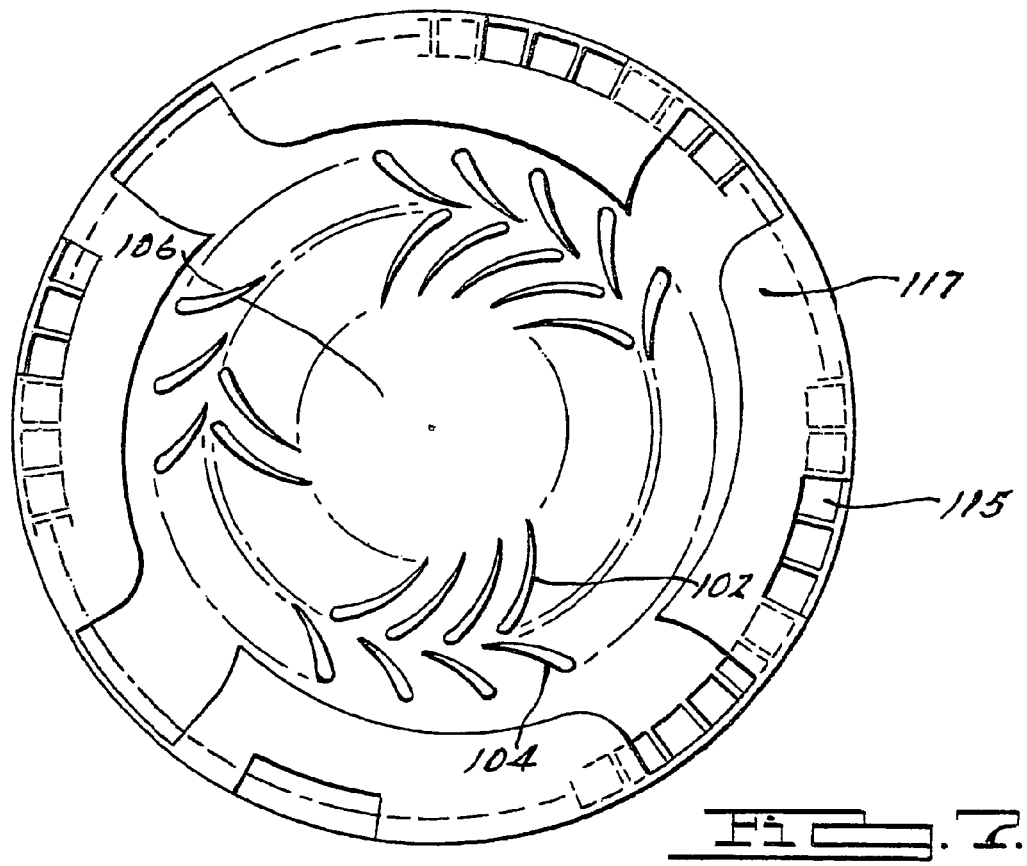
FIG. 1 is a cross-sectional view, taken along line 1-1 of FIG. 12, showing a first alternate embodiment of the ultra micro gas turbine apparatus of the present invention.

The following description of the preferred embodiments is merely exemplary in nature and is in no way intended to limit the invention, its application, or uses. The present invention provides methods and apparatuses for microscale gas turbine engines. The following definitions and non-limiting guidelines must be considered in reviewing the description of the invention set forth herein.

The present invention enables realization of a wide range of micro turbomachine componentry for producing sources of power, propulsion, and thermodynamic cycling that achieve high component efficiencies at sizes on the order of microns to millimeters. The micro turbomachinery of the present invention is dependent on fabrication of precise microstructures capable of operation at high temperatures and at high material stress levels. While the names and general functions of the micro turbomachinery of the invention are similar to that of conventional large scale turbomachinery, the specific design, operation, and manufacturing details of the micro turbomachinery and micro thermodynamic systems provided by the invention are quite different from those of conventional components and systems. This results from both the inherent changes in physical processes at small sizes and the material requirements for producing corresponding componentry. In the invention, micromachining techniques are employed to produce very high precision micro turbomachine componentry using techniques adopted from semiconductor processing. Beyond the precision enabled by this microfabrication processing, the economy of scale microfabrication batch-processing results in the ability to very cost effectively produce large quantities of micro turbomachinery and micro turbomachinery assemblies.

In general, a wave rotor is a device that utilizes unsteady wave motion to exchange energy by direct work action between fluids. A wave rotor includes an array of channels on the periphery of a rotor. As the wave rotor rotates, the ends of the channels are periodically ported to high and low pressure manifolds or ducts which generate and utilize waves in the channels. These pressure exchanging wave rotors are typically used as a topping unit to enhance the performance of a large scale gas turbine engine. As a topping cycle in a large scale gas turbine engine, the air from the engine compressor is directed into the wave rotor through a first port. The air flows into the channels of the rotor and is compressed by a series of compression or shock waves. This air leaves the wave rotor through a second port at a higher pressure than when it entered the wave rotor, and passes to a burner or combustor. After being heated in the burner, the gas returns to the wave rotor through a third port, driving a shock into the air residing in the channels. This gas is trapped within the channels as the third port closes at a high pressure. When the wave rotor rotates around to a fourth port, the gas expands out into the relatively lower static pressure in the fourth port and flows to the high-pressure engine turbine. In passing through the wave rotor, the air is first compressed and then expanded, thus, the wave rotor combines in a single device the functions performed by the compressor and turbine in a high spool. By using a wave rotor topping cycle, combustion temperatures greater than the turbine inlet temperature can be used since the gas leaving the combustor is cooled in expansion before being sent to the turbine. Also, since the rotor is washed alternately by cool inlet air and hot combustion gas, it is self-cooled and obtains a steady state temperature significantly lower than the combustion temperature.

The potential of non-steady machines for performance enhancement of thermodynamic cycles has been recognized on a large scale, but rarely exploited. Shock tubes, shock tunnels, pressure exchangers, pulse combustors, pulse detonation engines, and wave rotors are among the best-known wave devices developed so far. The basic concept underlying these devices is the transfer of energy between different fluids with shock and expansion waves. By generating compression and expansion waves in appropriate geometries, wave machines can transfer the energy directly between fluids without using mechanical components such as pistons or vanes impellers. In fact, these devices properly represent applications of classical non-steady one-dimensional compressible flow theory. The inherent non-linearity of large-amplitude wave phenomena in compressible flow fields and unusual geometry of non-steady devices has impeded the wide application of these machines in the gas turbine community. An innovative technology involving wave rotors that are state-of-the-art non-steady flow devices has provided new opportunities for further significant performance improvements of today's gas turbines.

A typical large scale wave rotor employs an array of several channels arranged around the axis of a cylindrical drum. The drum rotates between two end plates each of which has a few ports or manifolds, controlling the fluid flow through the channels. The number of ports and their positions vary for different applications. Through rotation, the channel ends are periodically exposed to the ports located on the stationary end plates initiating compression and expansion waves within the wave rotor channels. Therefore, unlike a steady-flow turbomachine which either compresses or expands the gas, both compression and expansion are accomplished within a single component. To minimize leakage, the gap between the end plates and the rotor has to be very small or the end plates can use a sealing material to contact the rotor.

Figure 3:
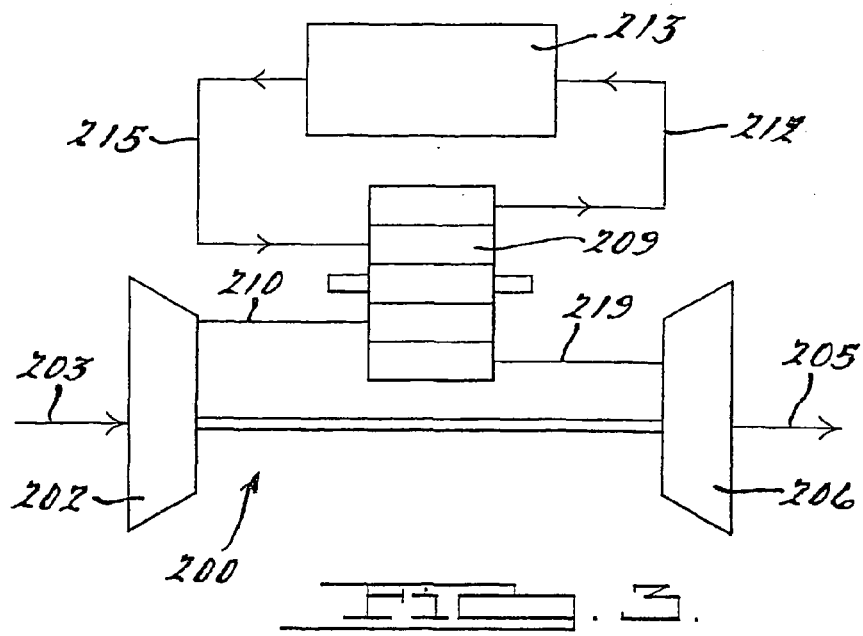
FIG. 3 is a diagrammatic view showing the process of an exemplary wave rotor topped gas turbine engine apparatus.

In a conventional, large scale arrangement 200, an axial wave rotor 209 is embedded between a compressor 202 and turbine 206 "parallel" to a combustion chamber 213. FIG. 3 illustrates how a four-port wave rotor 209 is used to top a large scale, gas turbine cycle. Air 203 enters compressor 202. Output air 210 from compressor 202 enters wave rotor 209 and is further compressed inside the wave rotor channels. After the additional compression of the air in the wave rotor, it discharges 212 into combustion chamber 213. Here, combustion takes place at a higher pressure and temperature than in the baseline engine. The hot gas leaving 215 combustion chamber 213 enters wave rotor 209 and compresses air 210 received from compressor 202. Because of the energy transfer, burned gas 219 expands during the compression of the air and is afterward scavenged toward turbine 206. Thereafter, exhaust 205 leaves turbine 206. In some embodiments, the large scale turbine 206 may be connected to an electricity generating device. Due to the pre-expansion in wave rotor 209, burned gas 219 enters turbine 206 with a lower temperature than that of combustor exit 215. However, the gas pressure is higher than the compressor exit pressure by the pressure gain obtained in wave rotor 209. The turbine inlet total pressure is typically 15 to 20% higher than the air pressure delivered by the compressor. This is in contrast to the untopped engine where the turbine inlet pressure is always lower than the compressor discharge pressure due to the pressure loss across the combustion chamber. As a result, more work can be extracted from the turbine. Finally, the channels are re-connected to the compressor outlet, allowing fresh pre-compressed air to flow into the wave rotor channels and the cycle repeats.

Figure 4:
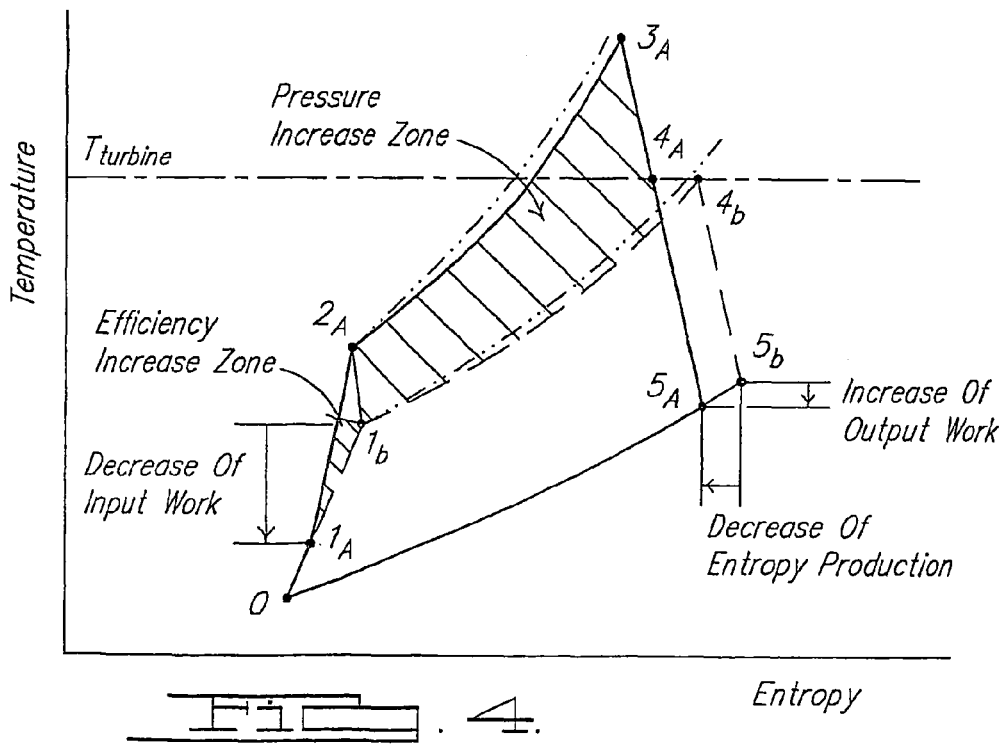
FIG. 4 is an entropy versus temperature graph comparing a standard gas turbine engine versus the exemplary wave rotor topped gas turbine engine apparatus of FIG. 3.

The general advantage of using a wave rotor becomes apparent when comparing the thermodynamic cycles of large scale baseline and wave-rotor-enhanced engines, as shown in FIG. 4. It is evident that both gas turbines are operating with the same turbine inlet temperature and compressor pressure ratio. However, the output work of the topped engine is higher than that of the baseline engine due to the pressure gain across the wave rotor. Because the amount of heat addition is the same for both cycles, the overall efficiency for the topped engine becomes higher than that of the baseline engine.

There are several important advantages of wave rotor machines. Their rotational speed is low compared with turbo machines, which results in low material stresses. From a mechanical point of view, their geometries can be simpler than those of turbo machines. Therefore, they can be manufactured relatively inexpensively. Also, the rotor channels are less prone to erosion damage than the blades of turbo machines which are mainly due to the lower velocity of the working fluid in the channels, which is about one-third of what is typical within turbo machines. Another important advantage of wave rotors is their self-cooling capabilities. They are naturally cooled by the fresh cold fluid ingested by the rotor. Therefore, applied to a heated engine, the rotor channels pass through both cool air and hot gas flow in the cycle at least once per rotor revolution. As a result, the rotor material temperature is always maintained between the temperature of the cool air, which is being compressed and the hot gas, which is being expanded.

Gas turbines are well known in the art. Most applications of such devices are large in scale, for example, jet engines on aircraft. However, with recent developments and improvements in micro electrical mechanical systems (hereinafter "MEMS") technology and nanotechnology, attempts have been made to miniaturize gas turbines. Ultra micro gas turbines are built on a millimeter scale and it is necessary for MEMS to be used to fabricate such an ultra micro gas turbine. Examples of ultra micro gas turbines can be found in U.S. Pat. No. 5,932,940 to Epstein et al. issued Aug. 3, 1999; and U.S. Pat. No. 6,392,313 to Epstein et al. issued May 21, 2002; both of which are incorporated by reference herein. Engine components may include a compressor, a diffuser having diffuser vanes, a combustion chamber, turbine guide vanes, and a turbine, each of which is manufactured by MEMS techniques. An exemplary MEMS technique is discussed in A. Epstein, "Millimeter-Scale, Micro-Electro-Mechanical Systems Gas Turbine Engines," *ASME J. Eng. Gas Turbine Power*, Vol. 126, pp. 205-226 (April 2004). In some embodiments, the microfabrication techniques of the structural material is common to all of the above elements.

The following discussion first presents the design of a micro-gas turbine engine as an example system that can be produced with the micro turbomachinery provided by the present invention. Alternative system designs and configurations are then presented, along with a discussion of the wide range of system applications. Specific designs for the enabling micro turbomachinery as well as fabrication, assembly, and packaging techniques for the micro turbomachinery and assemblies are also disclosed.

The first preferred embodiment of a micro gas turbine engine of the present invention includes an assembly of a micro compressor, micro combustor, micro turbine, and micro nozzle flow system that together form a micro-embodiment of the classic Brayton cycle engine. The micro-gas turbine engine includes micro bearings to support the rotating machinery, a fuel system to supply and meter fuel, and ignite the micro combustor, in addition to an integral electric motor to start the engine and which can be adapted to function as a generator for producing electric power.

In one variation, the overall engine is about 12 mm in diameter by about 3 mm in thickness, and employs an air inlet with an area of about 1 $mm^2$. The assembly, which can be packaged in a volume of less than about one cubic centimeter, can be operated in accordance with the invention to produce about 10-30 watts of power. In another variation, the gas turbine engine is about 20 mm in diameter and about 4 mm thick. A further exemplary gas turbine engine is less than about 1 cm in diameter and less than about 1 cm in thickness. As will be discussed in detail below, this predicted high level of performance, in combination with small size, addresses many portable, modular, and distributed power applications.

Straightforward scaling of the micro engine by changing the compressor rotor blade height to vary the air mass flow, or by geometric scaling of the overall design, can be accomplished to yield power outputs in the range of about 1-100 watts. As the micro engine size is scaled down, the fuel consumed per watt of power produced will increase due to viscous flow scaling effects. Increase of the pressure ratio to improve this performance can achieved, however, by turning the micro compressor and micro turbine faster, or by adding one or more additional micro compressor stages. Note that these specific performance levels are comparable with those of conventional, small gas turbines characterized by production of 100's of kilowatts of output power.

Compared to conventionally-sized gas turbine engines, the predicted thrust-to-weight ratio of the micro engine of the invention is many times higher due to cube-square scaling and the high strength-to-density ratio of the preferred refractory and microelectronic micro engine materials. Indeed, the micro engine design illustrated in FIG. 1 is characterized by an anticipated thrust-to-weight ratio of about 30:1, compared to about 12:1 for the best large-scale military engines, and about 5:1 for large civil transport engines. Furthermore, a micro engine that is adapted to accommodate increased air flow and pressure ratio can achieve thrust-to-weight ratios of about 100:1. The superior thrust-to-weight ratio of the micro engine arises because the engine power scales with the air mass flow, which is proportional to engine in-take area, i.e., the square of the linear dimension; engine weight scales with volume, the cube of the linear dimension. Thus, the power-to-weight ratio increases linearly as engine size is reduced.

The micro engine of the invention provides other advantages over conventional gas turbine engines. For example, the micro engine is characterized by an extremely rapid start-stop time, on the order of about hundreds of microseconds, due to the low moment of inertia of the micro turbomachinery. This low moment of inertia enables control of the micro engine with an unconventional scheme, namely, pulse width modulation. In this scheme, the micro engine is controlled to deliver only partial power to the load by rapidly varying the on-off duty cycle of the engine at a speed that is too fast for the load to respond. This corresponds to cycling of the micro engine between a full-on and full-off state many times per second. Throttling of a conventional large-scale engine with this thermodynamic cycle results in excess fuel consumption because the fuel consumed per watt increases at partial power for such engines. In contrast, the low moment of inertia of the present micro engine enables the micro engine to be operated either at peak efficiency or be off; and thus results in lower fuel consumption.

In addition, the micro engine is expected to have a significantly reduced level of emitted pollutants, e.g., the pollutant $NO_X$, that is about 1/100 that of large engines per unit power. Pollutant emission from the micro engine as a function of unit weight of fuel burned is reduced by this large factor due to the reduced time that fuel spends at high temperature in the combustor, which is about 1/10 that of a conventional engine, and the reduced peak temperature required in the micro engine.

The way in which the wave-rotor topping enhances the cycle at micro scale often differs from that at larger scales. At a large scale, mostly the goal is either to increase the cycle overall pressure ratio or to substitute the wave rotor for costly high pressure turbomachinery stages. The most significant performance gain has been found for engines with low compressor pressure ratio and high turbine inlet temperature. At the ultra-micro scale of the present invention, the optimum cycle pressure ratio is very small, for example around 2, due to the low component efficiencies. Thus, mostly a single-stage centrifugal compressor can easily generate the low optimum overall pressure ratio and a further increase with the same efficiency actually decreases the desired performance. Therefore, the wave rotor integration is most effective if its compression and expansion efficiencies are greater than those of the turbomachinery components of the baseline engine. This enhances not only the overall compression and expansion efficiencies, but it also increases the optimum cycle pressure ratio to a greater value allowing for additional performance improvements. In such a case in which the wave rotor compression efficiency is higher than that of the spool compressor, a wave rotor can enhance the performance of an ultra micro gas turbine that was already designed for an optimum pressure ratio. While the optimum overall compression ratio increases with the wave rotor integration, usually the pressure ratio of the spool compressor decreases. This can additionally enhance the isentropic efficiency of the spool compressor, provided its polytropic efficiency (aerodynamic quality) stays the same. These effects are schematically shown FIG. 4.

Figure 2:
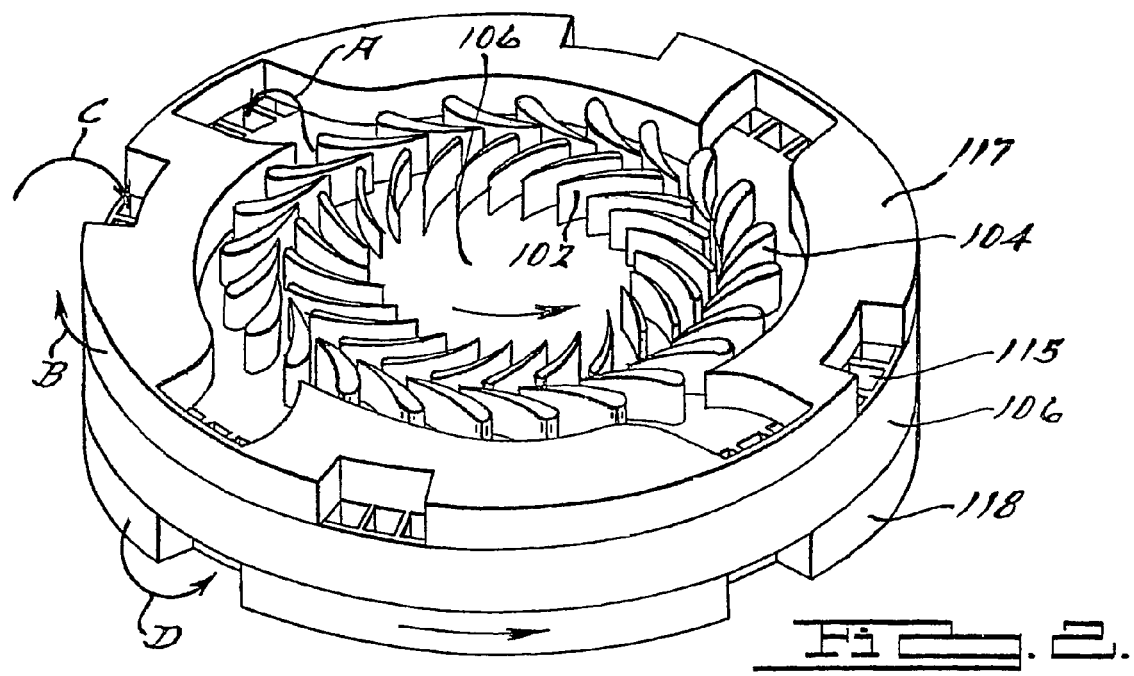
FIG. 2 is a perspective view showing the wave rotor system employed in the first alternate embodiment of the present invention apparatus.

Referring to FIGS. 1, 2 and 7, the first alternate embodiment of an ultra micro gas turbine 100 includes a spinning disk 106 sandwiched between two fixed members 125, 126. The spinning disk has compressor vanes 102 etched on top of disk 106 and turbine vanes 110 which are the mirrored image of compressor vanes 102 etched on bottom of disk 106. Around the edge of the disk 106 is a plurality of cells 115 which are continuous and uniform around the circumference of the disk. These cells 115 on disk 106 act as an axial wave rotor. Fixed member 125 includes a wave rotor port 117 and fixed member 126 includes a wave rotor port 118. Fixed diffusion beams 104 and turbine guide vanes 114 are made from the same wafer layer as spinning disk 106. In some embodiments, bearings are included to minimize friction on the rotating disk 106.

Air is brought into the system through an intake inlet 101 and is forced through the system by compressor 102 and passes by fixed diffuser 104 then enters wave rotor port 117 along flowpath A. Air then flows through cells 115 which act as the wave rotor and the air exits through wave rotor port 118 along flowpath B and enters combustion chamber 112. In combustion chamber 112, fuel 122 is added and ignited for combustion. Burnt gas enters wave rotor port 117 along flowpath C and goes through cells 115 and exits wave rotor port 118 along flowpath D. The burnt gas then passes the fixed turbine guide vane and moves through turbine 110 and is subsequently exhausted from system at outlet 120. The wave rotor rotates the rotating disk which includes a compressor and turbine, thus, there is only one single rotating disk in the engine. Since the wave rotor is a self-cooled device, it isolates the compressor disk from the combustion chamber in the wave rotor, and the heat is given to the compressed air adding a recuperative effect. The wave plates with ports 117, 118 at either side of the wave rotor may be etched in the same wafer as the stationary fixed members 125, 126, which will be discussed in greater detail hereinafter.

Figure 13:
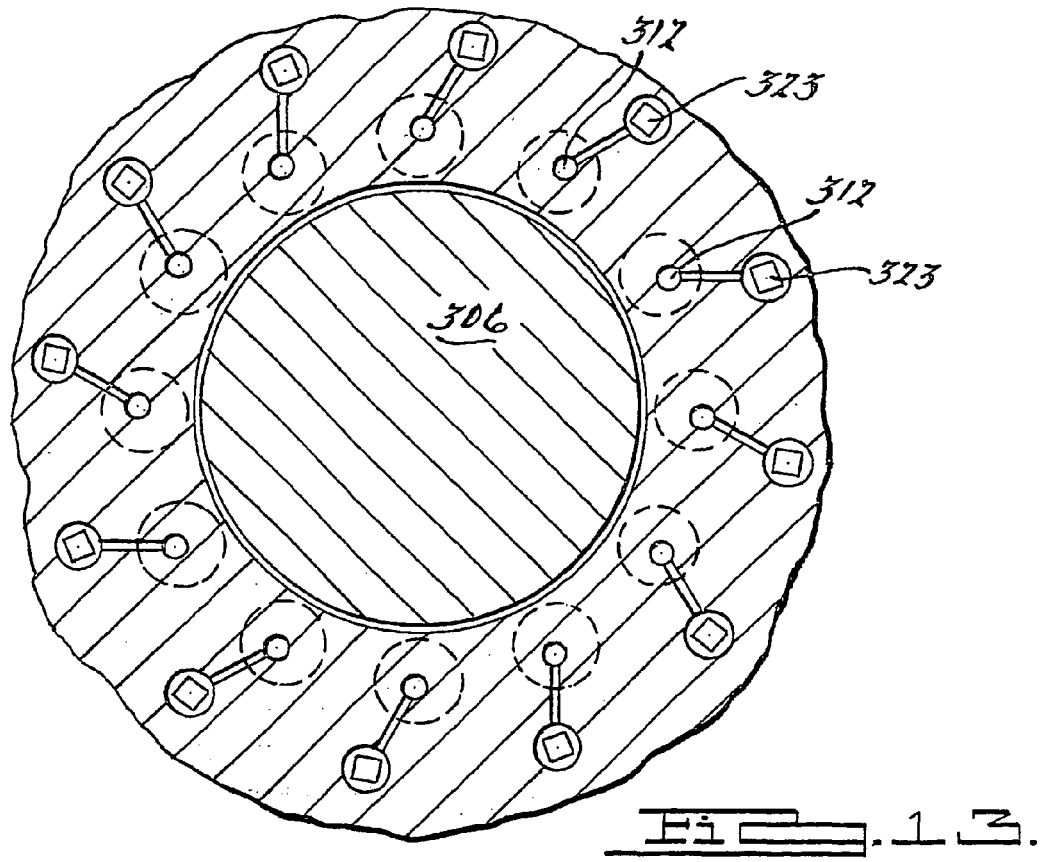
FIG. 13 is a fragmentary, top diagrammatic view showing a middle layer of an array of ultra micro gas turbine engines of the second alternate embodiment of the present invention apparatus.

Referring to FIGS. 5 and 13, a second alternate embodiment of an ultra micro gas turbine 300 includes two stationary members 325, 326 in which a rotating disk 306 is sandwiched between. Also sandwiched between stationary members 325, 326 are multiple axial wave rotors 323 arranged circumferentially around rotating disk 306 and a compression chamber 312. Compressor vanes 302 and turbine vanes 310 are part of rotating disk 306, and they are the mirror image of each other. Included on stationary member 325 is a rotor port end plate 317. Wave rotor end plate 317 may have four ports or multiple ports in four sets. Another wave rotor port end plate 318 is included on stationary member 326. Fixed diffuser vanes 304 and turbine guide vanes 314 are also provided. Wave rotors 323 rotate by the air flow therethrough (in other words, are self-driving) while end plates 317 and 318, as well as combustion chambers 312, are stationary. Similar to that as described above, air 301 is brought in through air intake and passes by compressor 302 and through diffuser vanes 304, thus entering wave rotor port end plate 317. It is then forced through wave rotor 323 exiting wave rotor port end plate 318 into combustion chamber 312 where fuel is added and ignited for combustion. Burnt gas then exits combustion chamber 312, enters wave rotor port end plate 317 and goes through wave rotor 323, exiting wave rotor port end plate 318. It subsequently passes turbine guide vane 314, enters turbine 310 and finally exits through an exhaust outlet 320.

A third alternate embodiment of an ultra micro gas turbine of the present invention has multiple layers and is shown in FIG. 6. In this embodiment, a rotating disk 406 is sandwiched between a stationary member 425 and a stationary member 426. An axial wave rotor disk 428 is also sandwiched between stationary member 426 and stationary member 427. Fixed diffuser vanes 404 and turbine guide vanes 414 are employed. Furthermore, stationary members 426 and 427 include wave rotor port end plates 417 and 418, respectively. Spinning disk 406 includes compressor vanes 402 and mirror imaged turbine vanes 410 opposite the compressor vanes. Spinning disk 406 is connected to wave rotor disk 428 by a central shaft 430 in one variation and the disks can be independently rotated in another variation where the wave rotor is self-driving. Wave rotor disk 428 has multiple wave rotor cells 415 equidistantly spaced around its circumference. Air is received at inlet 401, passes by compressor vanes 402 and diffusion vanes 404, where it then is forced down to wave rotor port end plate 418 and enters the axial channels of wave rotor cells 415. It subsequently exits wave rotor cells 415 through wave rotor port 417 and enters a combustion chamber 412 where fuel 422 is introduced and ignited for combustion. Flow thereafter enters wave rotor port end plate 417 and is forced back through wave rotor 428, which is then exits from. It next flows through wave rotor port 418, entering turbine 410 after passing by turbine guide vanes 414. The flow then exits through an exhaust outlet 420.

As explained above, the implementation of a wave rotor at ultra-micro scale appears most effective if its compression efficiency is greater than that of the baseline spool compressor. Whereas the latter ranges low around 50% at ultra-micro scale compared to about 70-90% at large scale, the compression efficiency of wave rotors ($\eta_{WC}$) have been found to be in the range of 70-86%, mostly assuming that the wave rotor expansion efficiency is equal to its compression efficiency ($\eta_{WT}=\eta_{WC}$). This may be considered as matching the efficiency of large scale compressors or turbines and as almost double of that achieved with ultra-micro scale compressors. The favorable wave rotor efficiencies are subsidized by the following. Taussig has reported $\eta_{WC}\cdot\eta_{WT}=0.70$-$0.74$, measuring the overall efficiency and not distinguishing between compression and expansion efficiency. In experiments at Rolls-Royce, Moritz has found $\eta_{WC}\cdot\eta_{WT}=0.6$. Kollbrunner has measured $\eta_{WC}$ alone as 60-68%. Wilson and Paxson in their calculations have used $\eta_{WC}=\eta_{WT}=0.83$, resulting in $\eta_{WC}\cdot\eta_{WT}=(0.83)^2=0.69$. Fatsis and Ribaud have varied both compression and expansion isentropic efficiency between 80-86% in their performance calculations. Thus, it appears that $\eta_{WC}=\eta_{WT}=0.83$ is a reasonable assumption for a large scale wave rotor with a cell length of about 200-300 mm. For the smallest documented wave rotor with a channel length of 69 mm, using the following wave-rotor characteristic equation (1) introduced by Wilson and Paxson and $\eta_{WC}=\eta_{WT}$, an isentropic compression efficiency of about 79% is calculated.

$$\frac{p_{t4}}{p_{t1}} = \Pi_{comb} \cdot PR_W \cdot \left\{ 1 - \frac{\frac{Cp_{air}}{Cp_{gas}} \frac{1}{\eta_{WT}\cdot\eta_{WC}} \frac{T_{t1}}{T_{t4}} \left[ PR_W^{(\gamma_{air}-1)/\gamma_{air}} - 1 \right]}{1 + \frac{Cp_{air}}{Cp_{gas}} \frac{1}{\eta_{WC}} \frac{T_{t1}}{T_{t4}} \left[ PR_W^{(\gamma_{air}-1)/\gamma_{air}} - 1 \right]} \right\}^{\frac{\gamma_{gas}}{\gamma_{gas}-1}} \quad (1)$$

Figure 8:
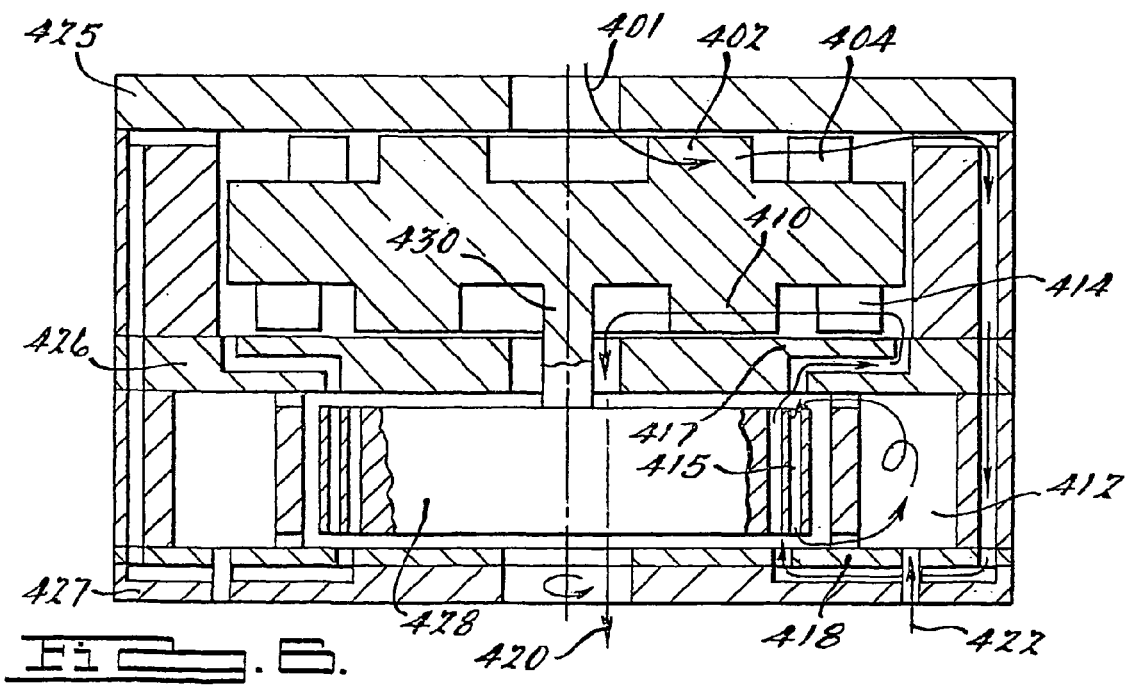
FIG. 8 is a graph showing wave rotor cell length versus efficiency comparing the present invention apparatus to others.
Figure 8:
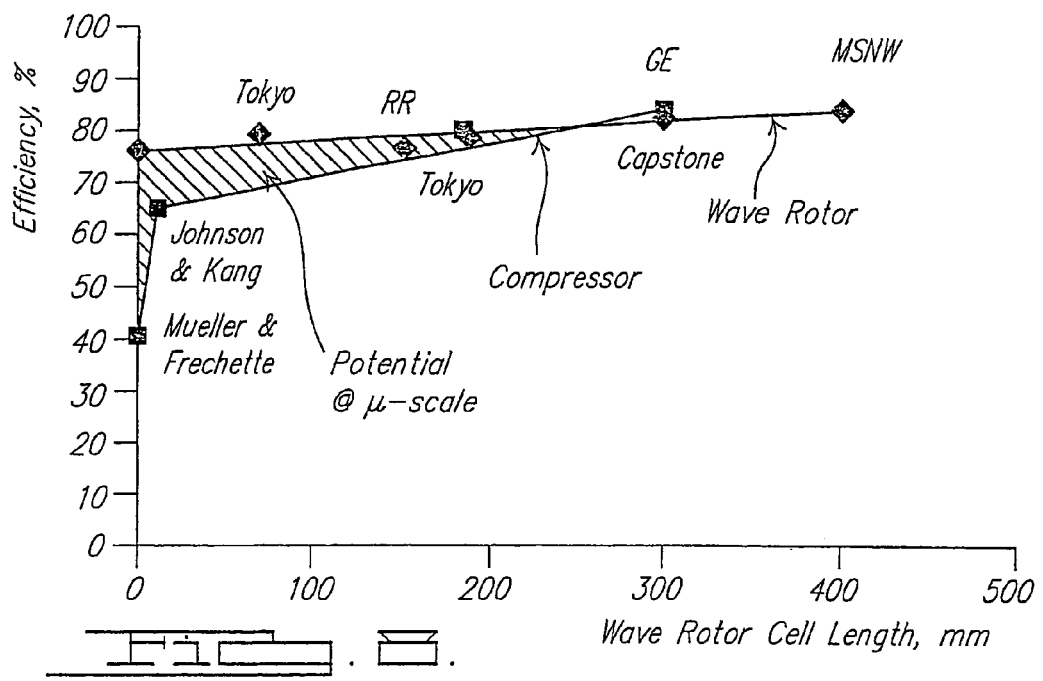

Using the available wave rotor efficiencies above versus the corresponding wave rotor channel length, a trend can be generated as shown in FIG. 8. The simple linear extrapolation predicts a wave rotor efficiency at ultra-micro scale (about 1 mm channel length) that is greater than 70%. Such a compression efficiency of a micro fabricated wave rotor is much better than the obtained efficiencies of around 50% for micro fabricated compressors. Furthermore, efficiency values of compressors suitable for or corresponding to the reported large scale, wave rotor topped cycle are also shown in FIG. 8. This allows showing the broken trend line for the compressor efficiency corresponding to the wave rotor length. Both trends for the wave rotor efficiency and for the compressor efficiency coincide at larger scale. However, towards smaller wave rotor size for the present ultra micro gas turbine, the compressor efficiency trend falls far below the wave rotor efficiency trend. This clearly suggests an advantage of using a wave rotor for ultra micro gas turbine.

Since the trend of the wave rotor compression efficiency can only be considered as a very first and crude estimate, a mathematical model was created that better reflects the physical background. The model considers the entropy production by a single normal shock that runs through the wave rotor channel and the wall friction generated by the gas flowing through the channel. Heat transfer effects are neglected and losses in exterior ducting and during the channel opening and closing are not considered.

Figure 9:
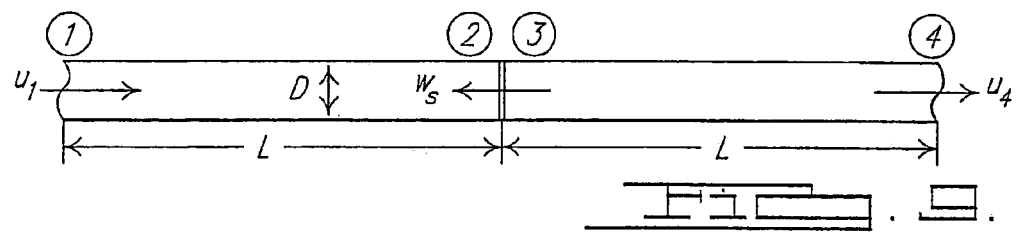
FIG. 9 is an illustration showing a shock wave experiment employing the present invention system.

Focusing on the phenomenon occurring inside a single channel, the one-dimensional mathematical model is based on the gas dynamics of normal shock waves for one-dimensional flow as described by Anderson. The model assumes a constant friction coefficient along the channel. The wave rotor channel is simulated as a tube with an equivalent diameter as shown in FIG. 9. The model relates the efficiency of the compression process to the velocity, pressure, and temperature of the gas at the entrance of the channel ($u_1$, $p_{t1}$, $T_{t1}$), the pressure ratio across the shock ($\Pi_s$), the friction coefficient, and tube dimensions. In FIG. 9, a shock wave is shown that moves in opposite direction to the flow. Friction is considered along the lengths L before and after the shock, assuming that the distance between points 2 and 3 is negligible. The shock wave position could be averaged to the middle of the channel, due to the fact that for low friction coefficients the resulting efficiency varies almost linearly with the position of the shock through out the channel.

Figure 10:
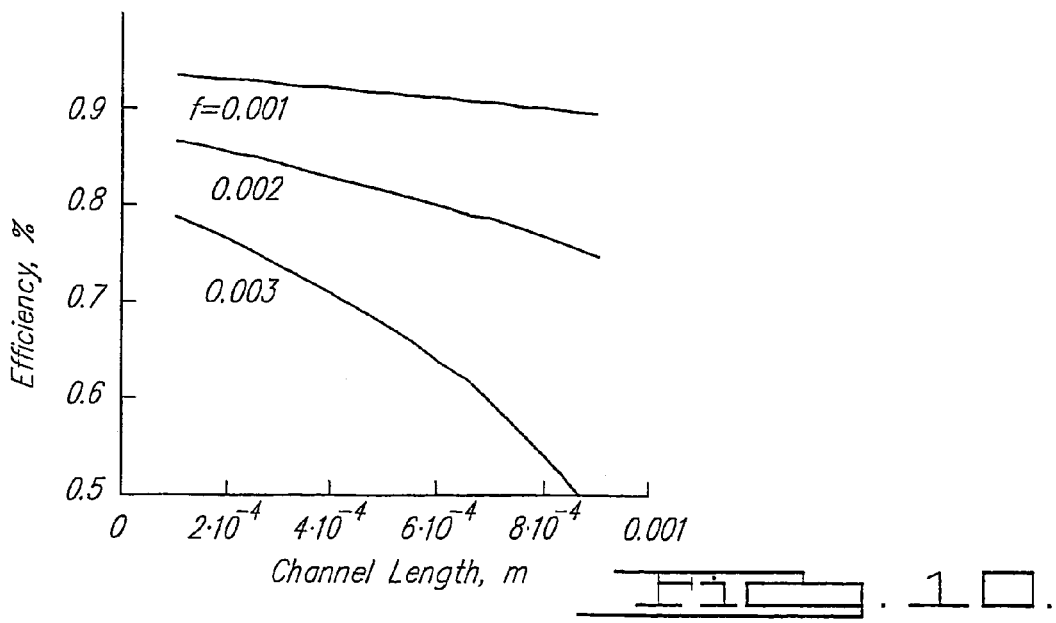
FIG. 10 is a graph showing channel length versus efficiency for the present invention apparatus.

Assuming a friction coefficient of 0.003 is representative for air/silicon typical in micro fabricated gas turbines, for a channel length of 1 mm and a cross-sectional area of 0.0078 mm$^2$ with inlet conditions: $p_{t1}=194.5$ kPa, $T_{t1}=443.3$ K, and conservative high $u_1=300$ m/s, the efficiency of the compression process averages at 80% for the relevant shock pressure ratios as shown in FIG. 10. FIG. 10 shows the isentropic shock wave compression efficiencies versus the shock strength for various friction coefficients and channel length to diameter ratios. For a friction coefficient of zero, the upper most graph is independent of the channel geometry. When friction is considered, it is seen that smaller length to diameter ratios yield higher efficiencies, which is encouraging at the ultra-micro scale of micro fabricated gas turbines where the channel length mostly turns out to be very short and channel diameters preferably should not be too small. Additionally, the efficiency of the shock compression process increases rapidly to around 80% with increasing shock strength up to approximately $\Pi_s=1.7\ldots 2$. After this it stays almost constant, especially for greater length/diameter ratios and friction coefficients. This can be viewed as a significant advantage compared to compressors where a decrease in isentropic efficiency is expected at higher pressure ratios. Finally, this graph shows that the same efficiency is obtained if the loss coefficient (the product of friction coefficient and length/diameter ratio) is the same. While the efficiency curves approach the zero friction line with smaller loss coefficient, their best efficiency points move towards greater shock strength with greater loss coefficients. The model itself is applicable for both large scale and micro scale, since the gas dynamics of the shock waves are assumed to be the same and the friction losses are proportional to the dimensionless loss coefficient.

After determining possible wave rotor efficiencies with the above approach, a thermodynamic calculation was performed to predict the performance enhancement of an ultra micro gas turbine. The analytical thermodynamic model was used to calculate the performance of both baseline and wave-rotor-topped cycles. The compressor inlet and outlet conditions are assumed to be the same for both engines. The baseline engine has a radial compressor with a pressure ratio of 1.94 and polytropic efficiencies of the compressor and turbine are 46% and 68%, respectively. Compression and expansion efficiencies of the wave rotor are both the same and equal conservatively assumed with 70%. The gases are treated as ideal gases with constant specific heat values ($Cp_{air}$=1.005 kJ/kgK and $Cp_{gas}$=1.148 kJ/kgK and constant ratios of specific heats ($\gamma_{air}$=1.4 and $\gamma_{gas}$=1.33). No losses are considered in the ducting, intake and exhaust. The intake conditions of the compressor are 101.3 kPa and 293 K, while the temperature at turbine inlet is fixed to 1465K. For a wave rotor pressure ratio of 1.8 and optimum overall pressure ratio, the thermodynamic calculation shows that the thermal efficiency is increased from 2.5% for the baseline engine to 7.5% for the wave-rotor-topped engine. This is equivalent to a relative increase of thermal efficiency of nearly 200% which is a significant value. Simultaneously, the compressor ratio reduces from 1.94 for the baseline engine to 1.44 for the enhanced engine.

Figure 11:
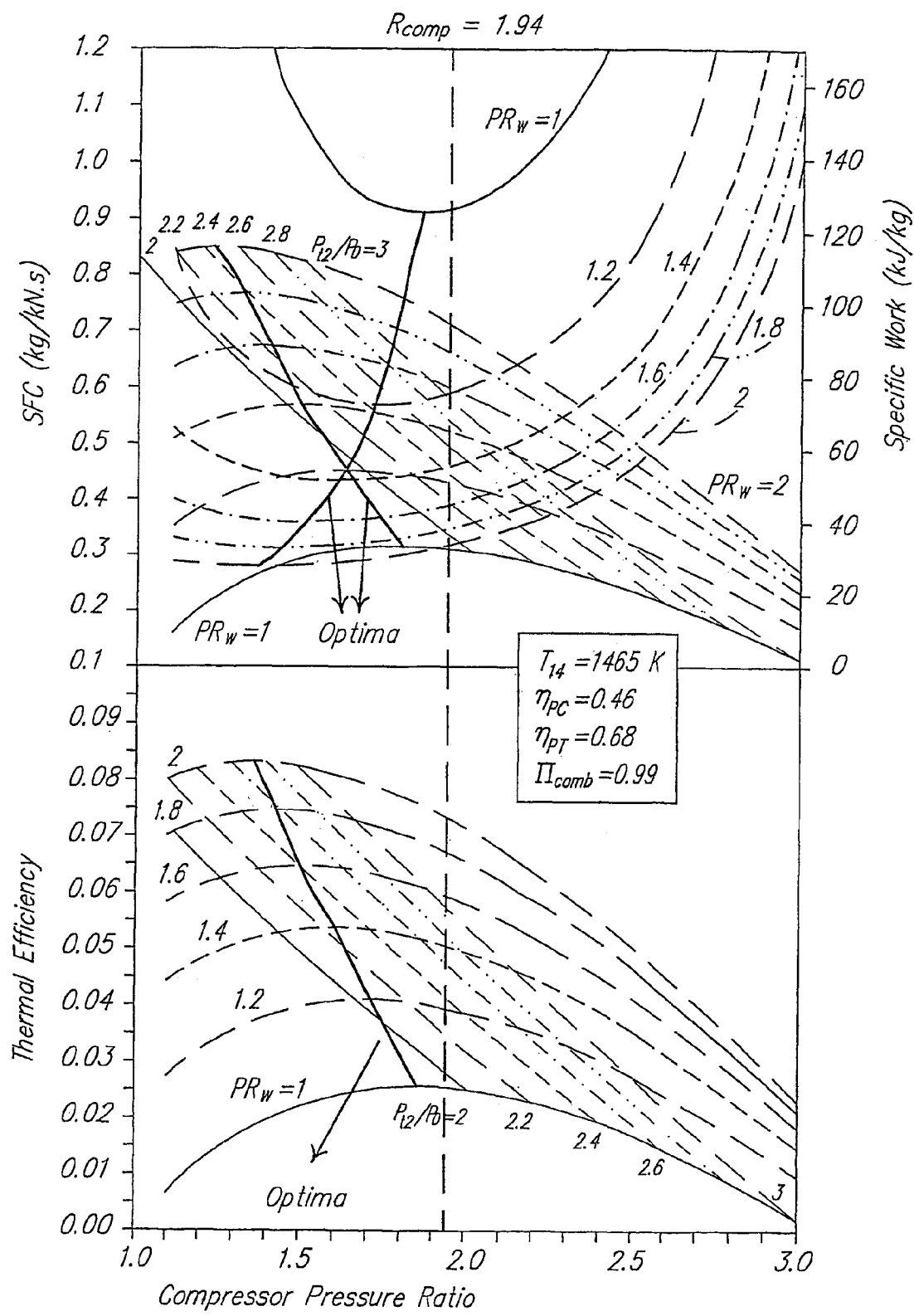
FIG. 11 is a graph showing data for compression pressure ratio, thermo efficiency, and specific work for the present invention apparatus.
Figure 14:
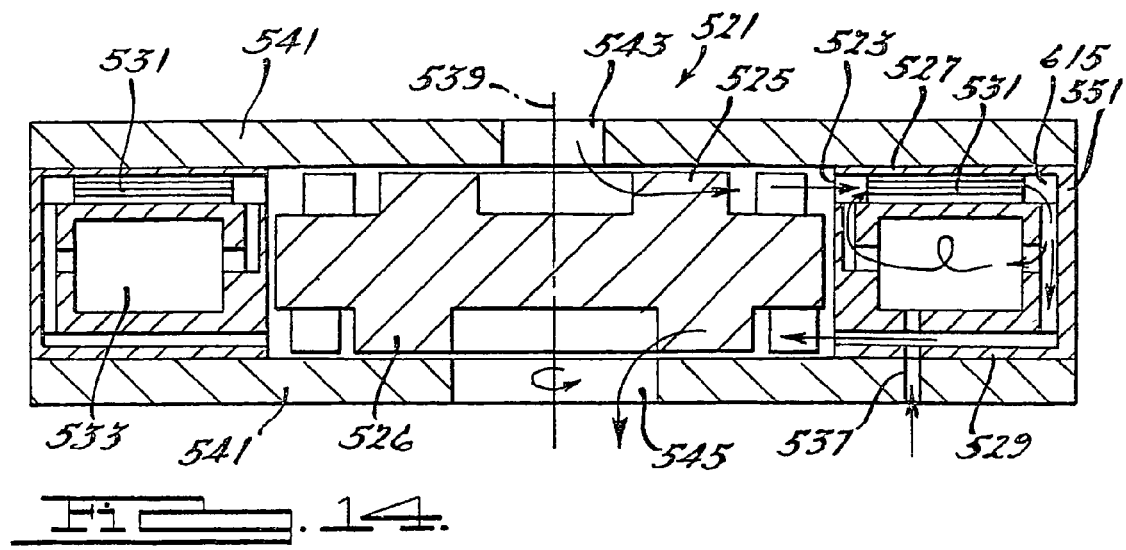
FIG. 14 is a cross-sectional view, taken along line 1-1 of FIG. 12, showing a first preferred embodiment of the ultra micro gas turbine apparatus of the present invention.
Figure 15:
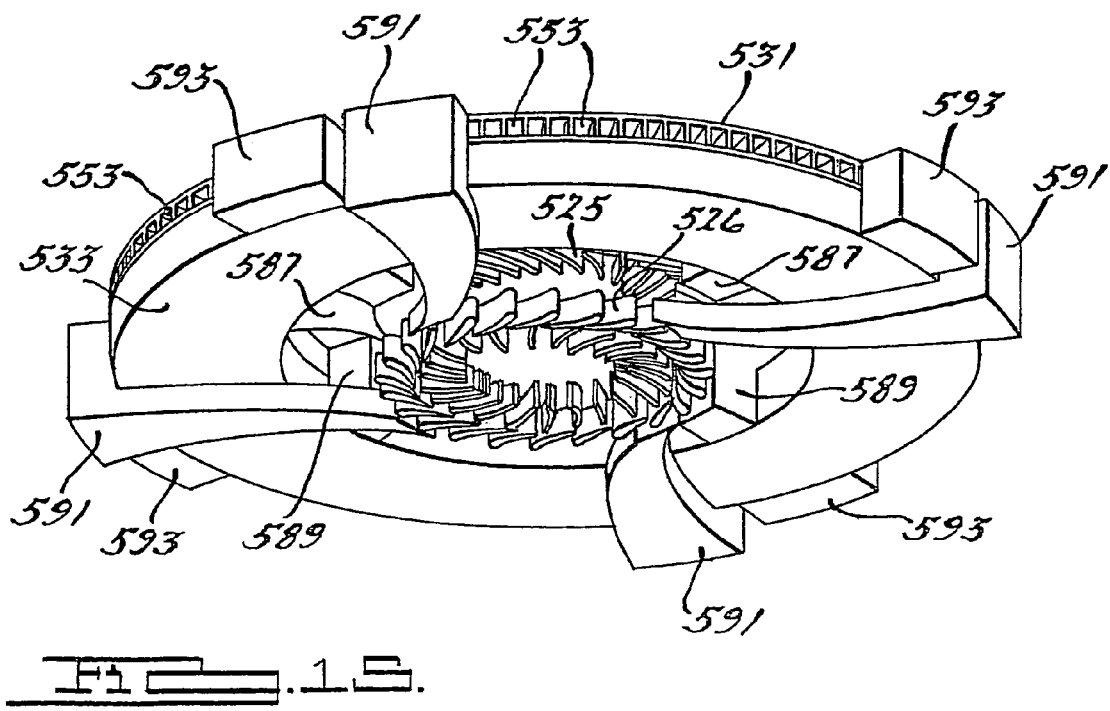
FIG. 15 is a perspective view showing the wave rotor system employed in the first preferred embodiment of the present invention apparatus.

FIG. 11 shows a performance map in which both the baseline and the topped engines can be found. Variations of the specific work, the overall thermal efficiency, and the specific fuel consumption as functions of the wave rotor pressure ratio ($PR_W$) and compressor pressure ratio (abscissa) are shown. The main fixed parameters are the turbine inlet temperature ($T_{t4}$) and the polytropic efficiencies of the compressor ($\eta_{PC}$) and turbine ($\eta_{PT}$) indicated in the box in the middle of the map. The black solid optimum lines connect the optimum compressor pressure ratio points at each achievable wave rotor pressure ratio for highest overall efficiency, for highest specific work, and least specific fuel consumption (SFC) respectively. It can be seen how the optimum shifts towards lower spool compressor ratio and higher overall pressure ratio with increasing wave rotor pressure ratio as discussed above.

Even if pressure ratio of the baseline engine is already optimized, the wave rotor can still enhance both the overall thermal efficiency and cycle specific work output if the wave rotor compression efficiency is higher than that of the baseline engine compressor. Adding a wave rotor also reduces the baseline compressor pressure ratio and the exit temperature of the compressor. Furthermore, this may reduce the compressor diameter and rotational speed which results in reduced mechanical and thermal stresses and relaxed design constraints. From the manufacturing point of view, adding a wave rotor is much easier at micro scale than at macro scale because the wave rotor can easily be etched in silicon due to its common extruded 2D shape. Additionally, in a regenerative way, the wave rotor allows the harvesting of some of the significant amount of heat conducted away from the combustor through the structure, which is a severe problem for micro fabricated gas turbines and also reduces the efficiency of the spool compressor severely. Three possible designs for integrating a wave rotor in micro fabricated gas turbines of the present invention are introduced herein. Based on documented wave rotor efficiencies at larger scale and subsidized by a gas dynamic model that includes wall friction, the wave rotor compression efficiency at microfabrication scale could be estimated with about 70%, which is much higher than the obtained efficiency of compressors in a micro fabricated gas turbine. It is shown that at such ultra-micro scale, the wave rotor can have the highest efficiency for shock wave pressure ratios in the range of 1.7-2, assuming that the microfabrication can generate a smooth enough surface with a low friction coefficient. The efficiency depends not only on pressure gain across the shock wave traveling through the wave rotor channel, but also depends highly on the loss coefficient for the channel geometry. According to modeling that is applicable for all wave rotor sizes, shorter wave rotor channels with a larger diameter inlet expect a higher compression efficiency of the wave rotor.

A first preferred embodiment of an ultra micro gas turbine apparatus employs a radial wave rotor apparatus as is shown in FIGS. 14-20. More specifically, ultra micro gas turbine apparatus 521 includes an inlet port 523, radial impeller or compressor vanes 525, turbine vanes 526, a first end plate 527, a second end plate 529, radial wave rotors 531, a combustor 533, a fuel inlet 537, a driving shaft, a housing 541, an air intake or inlet duct 543 and an exhaust outlet duct 545. LPA ports 587, HPG ports 589, LPG ports 591 and HPA ports 593 are also provided. Radial wave rotor 531 is preferably made from multiple, annularly shaped discs or layers 551 which each have multiple channels or passageways radially extending outward from a rotational rotor centerline axis 539 of the driving shaft, toward a peripheral surface. Channels 553 of each radial wave rotor 531 are created, for example, by simple welding, soldering, gluing channel walls on discs, a milling machine, an electrical discharge machine, chemical etching or the like in a metal or ceramic material. Each channel 553 of the current preferred embodiment has a straight configuration in an elongated radial direction and a constant rectangular cross-sectional area from its inlet, closest to rotor axis 539, to its peripheral outlet. Furthermore, the channels of each layer can alternately be circumferentially offset from the adjacent layers thereby forming a diagonal or oblique configuration to allow for different timing of fluid entry and exiting of the channels.

FIG. 21 illustrates a second preferred embodiment of a radial wave rotor 561 wherein multiple channels 563 in each of exemplary layers 565a and 565b have a curved configuration between each inlet 567 and outlet 569 to provide a self-driving feature. In the embodiment shown, the cross-sectional area between inlet 567 and outlet 569 also varies with the curve radius being more severe adjacent to the inlet and gradually expanding adjacent the outlet. Solid partition portions 571 are transversely disposed between each set of channels 563, much like that illustrated in FIG. 19. Layer-by-layer manufacturing is ideally suited for the curved channel configuration, allowing non-die locked or free from undercut access to all of the channels within a single layer at the same time. The curved or otherwise angled configuration is ideally suited for a "free-running" wave rotor where the impulse of entering or exiting fluid or the change of angular momentum of the internal flow self-drives the rotation of the wave rotor. The curved flow path of channels 563 of this embodiment advantageously provides a longer flow path given the same rotor diameter and packaging size thereby modulating the effect of radial forces on the flow to improve scavenging and acceleration/deceleration of the flowing fluid. This also advantageously allows for tuning of the design by changing shapes and flow lengths also in each layer differently, without affecting packaging size, thus changing wave travel timing. With the curved channels, angles can be easily varied in the design stage which will modulate the flow direction and acting accelerating/decelerating centrifugal force while also allowing the inlet and outlet angles to be independently varied.

Further, the preferred radial wave rotor embodiments are ideally suited for use in conjunction with a microfabricated gas turbine. The radial wave rotor allows for incorporation of the wave rotor in the disc or wafer-based assembly without introducing additional flow bends (which would cause additional losses) like a conventional axial wave rotor would require. The MEMs micromachine engine includes the housing, compressor and turbine of very small size; for example, the housing has an outer diameter less than about 12 millimeters, with a thickness of about 3 millimeters or less. The compressor is located within an internal cavity of the radial wave rotor. The combustion chamber is stationarily affixed to the housing while the compressor, wave rotor and turbine are allowed to rotate about the central axis. In such a small scale, efficiency of the compressor and turbine are traditionally very low. Also, the compression ratio is low for one step compression in traditional devices. Use of the radial wave rotor of the present invention, however, increases the total compression ratio. It is expected that the radial wave rotor advantageously rotates less than about 100 rpm while the turbine and compressor rotate at speeds reaching one million rpm, in the reverse-flow configuration shown.

The wave rotor apparatus 531 operates as follows with reference to FIGS. 14-17. Fresh air enters air intake 543 and flows to compressor inlet port 523. This air flow causes compressor vanes 525, and thus its attached disk, to also rotate, which in turn, forces the intake air into the radial wave rotor channels 553 when they are aligned with port 523 of first end plate 527. The air inserted from compressor vanes 525 to wave rotor channels 553 is preferably of a non-supersonic flow and will generate unsteady shock waves inside channels 553 due to pressure differences between the compressor outlet and the temporarily lower pressure in channels 553. The centrifugal force additionally supports the flow in channels 553. Fuel is mixed with the air in combustor 533 and is fed back into ports 523 and channels 553. The radial action of wave rotor 531 improves scavenging and acceleration of fluid within each channel. The fluid flowing action from compressor vanes 525 and through wave rotor channels 553 can also serve to rotate radial wave rotors 531, after which, the burned gases exit the channels aligned with a port 615 of second end plate 529. In other words, air flows from the compressor to the wave rotor through LPA ports. The air flows from the wave rotor to the combustion chamber through HPA ports. Exhaust gases flow from the wave rotor to the turbine through LPG ports, and exhaust gases flow from the combustion chamber to the wave rotor via HPG ports.

In the case of a fluid driven wave rotor, the wave rotor may extract even more energy from the fluid and drive an additional generator connected to it or integrated in it and the housing. The periodical exposure of the channels to the port openings in the end plates initiates compression and expansion waves that move through the wave rotor channels and internally generate an unsteady flow in the wave rotor. Thus, pressure is exchanged dynamically between high pressure and low pressure fluid utilizing unsteady pressure waves such that both compression and expansion are accomplished in the single component, being the wave rotor. Combustion takes place within the channels in the form of deflagration or even detonation, generating the major shock wave while further compressing the fluid before it exits toward the turbine vanes 526 and generates an expansion wave that draws in fresh pre-compressed air from the compressor vanes 525. The exiting pre-expanded gases flow to and impinge upon vanes 526 of the turbine portion, thereby further forcing the disk attached to the turbine vanes to rotate. The expanded gases are subsequently exhausted and exit from outlet duct 545 to atmosphere. Expanded and burned gases exiting outlet duct 545 may go through supplemental conduits or ducts, or a jet nozzle (not shown). The channel wall temperature of the wave rotor is maintained between the temperature of both fluids through the periodic exposure of the channels to both fluids between which the pressure is exchanged, thereby providing a self-cooling feature. Furthermore, the channel length of all of the axial and radial embodiments of the present invention are preferably less than two centimeters and more preferably less than one centimeter. As used herein, channel length is essentially the length of the rotor for the axial wave rotor configuration, or the difference between the outer and inner diameters for the straight channeled radial wave rotor configuration.

Turning now to materials considerations for the micro engine, in general, structural materials must be selected based on the same criteria as that for conventionally-sized engines, with additional considerations for changes in physical properties in the micron regime and microfabrication processing limitations. Basic selection criteria for jet engine materials include strength, strength-to-density ratio, modulus, chemical resistance, oxidation tendency, creep, creep rupture, high cycle fatigue, thermal conductivity, thermal expansion, fabricatability, and cost. The relative importance of these parameters depends on the nature of the specific engine component for which their use is intended, rotating or stationary component functions, and location within the engine including location within the compressor, combustor, turbine, bearings, or other subsystem. Conventionally-sized engines typically employ a variety of materials to maximize performance and minimize weight and cost. The relative importance of these various considerations is different for the micro engine of the invention because fabrication considerations dictate many of the parameters that can be realized in the micro engine as a practical matter.

Considering specific engine materials for the present invention, refractory ceramics such as silicon carbide (SiC) and silicon nitride ($Si_3N_4$), as well as silicon, all characterized as microelectronic materials, are ideal materials for gas turbines because of their high strength-to-density ratio, high thermal conductivity, and good oxidation resistance. In particular, a high strength-to-density ratio is preferred to enable rotor speeds of at least about 500,000 RPM. The use of these materials in conventional engines has been limited, however, by their characteristic brittleness, which introduces a requirement for critical flaw-free fabrication, the difficulty of which scales with the mass of a given engine part.

The present invention employs microfabrication techniques that can enable the precise manufacture of nearly flaw-free micro engine parts to overcome the practical limitations of these refractory ceramics that are characteristic at macro sizes. The low mass of the micro-scale microcomponentry designs of the micro engine further reduces these limitations. As a result, the structural components of the micro engine can be fabricated as a practical matter entirely from SiC or $Si_3N_4$ with coatings layers of electrical semiconductors and conductors as needed for proper electrical operation and chemical reactivity. SiC is preferred as a structural material. Advantageously, both SiC and $Si_3N_4$ have characteristic properties that accommodate requirements of both the hot and cold sections of the micro engine and further, a unitary micro engine structural material system eliminates interface problems common to multiple material systems.

Other materials and combinations of materials can be employed for the micro engine, however. At relatively low burner temperatures, e.g., below about 1200K, a micro engine produced either partially or entirely of silicon componentry is feasible, as is combination silicon-silicon carbide or silicon nitride systems. For example, structural silicon microcomponentry can be coated with a relatively inert material, e.g., a $Si_3N_4$ coating, for improved oxidation resistance. Given the much more extensive microfabrication and micromachining technology base that now exists for silicon compared with other materials, silicon is the micro engine component material of choice when temperature limitations and chemical compatibility are not issues.

Considering other micro engine materials, alumina is an attractive micro engine component material that can accommodate burner temperatures higher than that accommodated by SiC or $Si_3N_4$. Alumina is less resistant to thermal shock than these materials, but thermal shock is not a serious concern for the micro engine, given the small size of its components. Keeping this limitation in mind, however, there are many applications for which alumina will be preferred. Refractory metals and metal alloys such as those based on nickel, iridium, rhenium, tantalum, and niobium, are also suitable materials and are attractive because of their strength and oxidation resistance. Microfabrication processes, such as chemical vapor deposition processes (CVD), are generally established for these materials, making them particularly attractive from a manufacturing perspective. Intermetallic compounds, such as molydmium silicide, can also be employed. As can be readily understood, the wide range of materials considerations for a given micro engine application will dictate a preferred material or material combination. The fabrication process description presented later in the discussion will further highlight specified materials considerations and suitable alternatives.

There are many applications for the micro-gas turbine engines of the invention, in some cases providing a superior replacement for existing, more conventional devices, and in others, embodying new capabilities enabled by the micro engine's design and operational characteristics. When configured as a micro generator, the micro-gas turbine generator is a source of electrical power, for example, as a replacement for batteries. Compared to the best batteries, the micro-gas turbine generator can produce twenty times the power and energy for the same weight and volume. The micro engine has the additional advantage of extremely fast "recharge" time, i.e., needs little time for refilling the fuel tank, compared to the typical recharge time of a conventional battery. Furthermore, unlike batteries, micro engines are environmentally friendly, presenting no disposal problems. There is also no explosion risk with micro engines, as is common with lithium-based batteries.

Micro engine electric power sources are applicable to all portable electric power applications for which air is available. This includes, for example, portable computers, radios, and other electronic devices, telephones, such as cellular telephones, and other communication devices, power tools, heaters and coolers, military weapons such as missiles, and other applications. The very low noise produced by the micro engine makes it particularly suitable for applications such as office electronics as well as military reconnaissance. The micro engine is further advantageously employed in manned mobile scenarios such as fire fighting; here, individual power packs of one or more micro engines can be provided to fire fighters for autonomous, mobile powering of personal protection and communication apparatuses. The micro engine can similarly be employed to power implanted medical devices such as pace makers.

When more power is required than can be provided by one micro engine unit, many micro engines can be employed in parallel. For example, approximately 1000-2000 units can be employed in a hybrid electric automobile in which the micro engines provide electricity to power electric motors driving the wheels. This application achieves very low pollution production and good fuel economy, because the micro engines can be individually turned on or off as power is required, essentially instantly from a driver's point of view. As a result, the array of micro engines can be controlled such that no fuel is burned at "idle." In another vehicular application in accordance with the invention, the micro engine is employed as an auxiliary power generator to provide power for heating, cooling, electronics, or other componentry at times when a main vehicular engine is off, for example, when cooling the automotive land vehicle while the main vehicle engine is off.

Micro gas turbine generators can also be used for distributed power applications, such as where it is undesirable to run electrical power distribution wiring, such as for self-powered aircraft actuators in which electric power is preferably generated locally in the actuator. Here one or more micro engine generators can be configured at the desired point of actuation. This configuration is especially advantageous in that such actuators are commonly located near a fuel supply in the aircraft wings, control surface deflectors, or the like. Local micro-power generators in accordance with the invention can also be employed to provide local power redundancy for critical components, thereby insuring against failure of a central power system. For example, one or more arrays of micro engine generators can be employed for back up of a computer or display apparatus. In a further example, arrays of micro engine generators can be employed to provide residential electric power with the waste heat used for hot water and heating. Moreover, armored land, water or aerospace vehicles used for military purposes advantageously benefit from the redundancies of an array of the turbines in the event that some are destroyed in combat. As can be recognized, a wide range of other applications of micro engine generator systems is contemplated and enabled by the invention.

Referring to FIG. 12, an array 150 of ultra micro gas turbines 100 is illustrated on a vehicle body 909. Such an array 150 can be used in numerous applications as shown in the non-limiting examples below. Manufacturing of array 150 may be done by vapor deposition in three different layers. The first layer is a stationary member which includes stationary member 126. The second layer includes rotating disk 106 and combustion chamber 112. The third layer includes stationary member 125. Layers may vary from 1 mm to 500 microns in thickness and the array may be as small as about 500 microns. It can also be as thick as about 3 mm or larger, up to about 1 cm.

Figure 23:
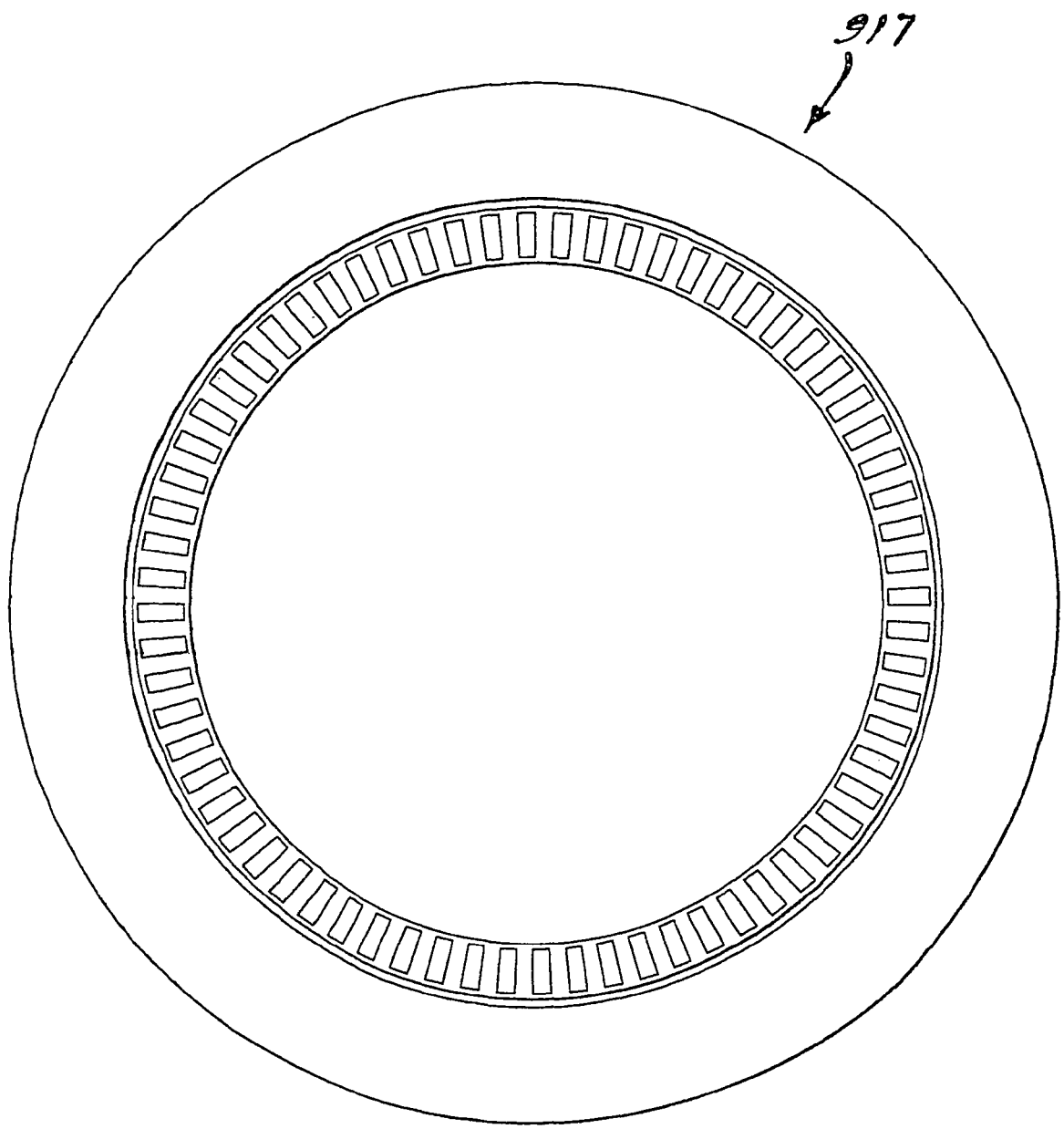
FIG. 23 is a diagrammatic top view showing a positive mask for photoresist patterning preferably employed in manufacturing any of the axial embodiments of the present invention apparatus.

The microfabrication methods used for an axial apparatus of the present invention are preferably set forth in FIGS. 22a-23. First, in FIG. 22a, a Si wafer 911 is chemically cleaned. Second, FIG. 22b shows deposition of $SiO_2$ coatings 913 onto wafer 911 by thermal oxidation. Third, the wafer and coating assembly are spun and photoresist layers 915 are then baked on, as shown in FIG. 22c. Fourth, in FIG. 22d, the photoresist layers are exposed to ultraviolet light through the positive mask 917 illustrated in FIG. 23. Fifth, FIG. 22e shows the development of the photoresist layers which are baked for hardening. Subsequently, sixth, the $SiO_2$ coating is etched in RIE or BHF etchant as is shown in FIG. 22f. Seventh, wafer 911 is etched with a DRIE chemical, as illustrated in FIG. 22g. Eighth, as shown in FIG. 22h, photoresist layers 915 are stripped. Ninth, $SiO_2$ wafer 911 is etched in RIE or BHF etchant, as shown in FIG. 22i. Referring to FIG. 22i, the tenth step includes precise laser alignment and then fusion bonding together of two wafer layers 911 and 911'. Finally, FIG. 22k shows an outer ring of wafer layers removed.

A micro-gas turbine engine in accordance with the invention is operationally characterized as a jet engine, and therefore is a source of thrust that can be employed for propulsion and control of aircraft vehicles. A relatively small drone aircraft can be powered by a single micro engine, and a larger aircraft or missile-type vehicle can be powered by an array of several hundred or thousand micro engine units. Indeed, a large manned aircraft can be powered by arrays of several million micro engines distributed about the surface of the aircraft.

The use of arrays of micro engines has several advantages in enabling directional or steering control of an aircraft by way of differential throttling of specific individual engines in the array. Preferably, such arrays are located in positions on a vehicle surface such that they operate within the surface boundary layer, thereby functioning as mathematical sources and sinks of fluid. This results in a reduction of the drag and an increase in the lift of an aircraft powered by the micro engines, whereby airfoil lift-to-drag ratio and thus flight efficiency are improved. The boundary layer control, drag reduction, and lift enhancement capabilities provided by the invention can be utilized as a result of micro engine propulsion or alternatively, in conjunction with one or conventional engines for propulsion to provide a superior flight control configuration.

The very small size of the micro engine exhaust jet and the high rotational speed of the micro engine turbomachinery greatly reduces the noise produced per unit of thrust over that of conventional engines. Further, the micro engine size regime moves the predominance of the noise power that is produced by the micro engine to frequencies that are above that of human hearing and that rapidly attenuate in air over short distances. Thus, micro engine propulsion units are substantially quieter than conventional engines. This can provide substantial advantages for both consumer and military applications of large micro engine arrays. In a further example of a micro engine array application, a planar array of micro engines is employed for vertical propulsion of a platform. Micro engines are particularly well-suited for such a vertical lift application due to their compactness and very high thrust-to-weight ratio compared to that of conventional engines.

The microfabrication techniques provided by the invention for production of the micro engine enable a wide range of device adaptations that further enable many applications and are improvements over conventional device capabilities. In the case of micro engine features or subsystems that are coplanar in configuration, the features and subsystems can be fabricated simultaneously and yet take on different out-of-plane geometry. Such is the case with the planar electric-drive micro-turbine configuration, in which the micro compressor and micro turbine, or propellant micro pumps, are of differing out-of-plane geometry but fabricated simultaneously.

As is demonstrated by the breadth of this disclosure, the range of applications for the micro engines provided by the invention is truly vast. While the discussion cannot address each and every application, it is intended to indicate the extensive capabilities contemplated by the invention. For example, alternative microfabricating methods can be used including coating, deep reactive ion etching, directional etching, doping, mask lithography, or other techniques. The examples and other embodiments described herein are exemplary and are not intended to be limiting in describing the full scope of apparatus, systems, compositions, materials, and methods of this invention. Equivalent changes, modifications, variations in specific embodiments, apparatus, systems, compositions, materials and methods may be made within the scope of the present invention with substantially similar results. Such changes, modifications or variations are not to be regarded as a departure from the spirit and scope of the invention.

What is claimed is:

1. An engine disk comprising a compressor, a wave rotor, and a turbine, wherein the compressor, wave rotor and turbine are in selective fluid communication, and wherein all linear dimensions of the wave rotor are less than two centimeters.

2. The disk according to claim 1 wherein the compressor is on a surface opposite to the turbine.

3. The disk according to claim 1 wherein the wave rotor comprises silicone, silicone carbide, silicone nitrate or combinations thereof.

4. The disk according to claim 1 wherein the wave rotor is twenty millimeters or less in diameter and the engine disk has a thrust-to-weight ratio of at least about 100:1.

5. The disk according to claim 1 wherein each channel of the wave rotor is ten millimeters or less in length.

6. The disk according to claim 1 wherein the engine is four millimeters or less in thickness.

7. The disk according to claim 1 wherein the engine is ten millimeters or less in thickness.

8. The disk according to claim 1 wherein the thrust-to-weight ration is at least 30:1 and the normal speed of the wave rotor is less than 100 rpm.

9. The disk according to claim 1 further comprising air flowing through an intake inlet with the assistance of the compressor, then entering a wave rotor port, thereafter flowing into the wave rotor and a combustion chamber where fuel is added and ignited, whereafter burnt gas exits another wave rotor port, and the burnt gas then passing through the turbine.

10. The disk according to claim 1 wherein the wave rotor is an axial wave rotor.

11. The disk according to claim 1 further comprising spinning vanes of the compressor being part of the same wafer layer as turbine guide vanes and a fixed diffuser.

12. The disk according to claim 1 wherein the turbine, wave rotor and compressor are part of a small Brayton cycle engine which generates electricity.

13. The disk according to claim 1 wherein the wave rotor includes an array of channels which are periodically ported to high and low pressure ducts to create air flow expansion waves to directly transfer energy between fluids in the wave rotor, and the wave rotor is a MEMS material.

14. The disk according to claim 1 wherein the wave rotor further comprises axially parallel channels periodically ported to high and low pressure areas to create expansion waves, air flowing from the compressor to the wave rotor, and combustion gases flowing from the wave rotor to the turbine.

15. An engine disk apparatus comprising a compressor, and a wave rotor including multiple channels rotatable about an axis, a channel length of the wave rotor being less than about one centimeter.

16. The apparatus of claim 15 wherein at least a majority of the channels have a curved elongated orientation.

17. The apparatus of claim 15 wherein the wave rotor is a radial wave rotor.

18. The apparatus of claim 15 wherein the wave rotor is part of a gas turbine.

19. A turbine disk comprising a radial wave rotor including a rotational rotor axis and fluid carrying channels having fluid flow directions oriented substantially radial to the rotor axis, the radial wave rotor operably creating a compressed fluid-pressure wave, and the radial wave rotor including a channel length less than about two centimeters.

20. The turbine of claim 19 further comprising a compressor located internal to the radial wave rotor, the compressor operably rotating around a compressor axis.

21. The turbine of claim 19 wherein the radial wave rotor is less than about five millimeters in thickness as measured along a rotational axis.

22. The turbine of claim 19 wherein at least a majority of the channels have a straight elongated orientation.

23. The turbine of claim 19 wherein at least a majority of the channels have a curved elongated orientation.

24. The apparatus of claim 19 further comprising:
a compressor;
an internal end plate having at least one port, the internal end plate being located between an internal surface of the wave rotor and the compressor; and
an external end plate having at least one port, the external end plate being located around an exterior surface of the wave rotor substantially coaxial with the rotor axis;
the ports of the internal and external end plates selectively aligning with the wave rotor channels depending upon the positioning of the wave rotor.

25. The turbine of claim 19 wherein fluid flows into the wave rotor at a subsonic speed.

26. The turbine of claim 19 wherein the wave rotor is part of an aircraft jet engine.

27. A method of manufacturing a power generation assembly, the method comprising:
(a) creating a first member including outwardly radiating fluid passageways, the passageways each having a length less than about two centimeters, wherein the first member is a wave rotor;
(b) creating a second member, having a size of less than about two centimeters, to include fluid-contacting vanes;
(c) providing selective fluid communication between the first and second members;
(d) allowing the first and second members to rotate independently of each other in at least one condition; and
(e) utilizing shock waves inside the passageways of the first member to transfer energy from a high energy fluid to a low energy fluid, increasing both temperature and pressure of the low energy fluid.

28. The method of claim 27 wherein the first member is a radial wave rotor and the second member is a compressor.

29. The method of claim 27 further comprising connecting the first member to an aircraft engine.

30. The method of claim 27 further comprising connecting the first member to a land vehicle engine.

31. The method of claim 27 further comprising connecting the first member to a gas turbine.

32. A method of manufacturing a turbine disk comprising microfabricating a turbine disk including a wave rotor having an internal channel length less than two centimeters.

33. The method of claim 32 further comprising using photoresist and etching as part of the microfabricating.

34. The method of claim 32 further comprising microfabricating the wave rotor from at least one material essentially taken from the group of: (a) silicone, (b) silicone carbide, (c) silicone nitrate, or combinations thereof.

35. The method of claim 32 further comprising utilizing shock waves inside the passageways of the first member to transfer energy from a high energy fluid to a low energy fluid, increasing both temperature and pressure of the low energy fluid.

36. The method of claim 32 further comprising orienting multiple internal channels of the wave rotor in a substantially radial direction relative to a rotational axis.

37. An engine disk comprising:
a compressor;
a wave rotor;
a turbine;
the compressor, wave rotor and turbine being in selective fluid communication;
a first fixed member including a wave rotor port; and
a second fixed member including a wave rotor port;
the compressor including etched vanes spinned between the first and second members.

38. The disk according to claim 37 wherein the compressor is on a surface opposite to the turbine.

39. The disk according to claim 37 wherein the wave rotor comprises silicone, silicone carbide, silicone nitrate or combinations thereof.

40. The disk according to claim 37 further comprising air flowing through an intake inlet with the assistance of the compressor, then entering a wave rotor port, thereafter flowing into the wave rotor and a combustion chamber where fuel is added and ignited, whereafter burnt gas exits another wave rotor port, and the burnt gas then passing through the turbine.

41. The disk according to claim 37 wherein the wave rotor is an axial wave rotor made of a MEMS material.

42. The disk according to claim 37 further comprising spinning vanes of the compressor being part of the same wafer layer as turbine guide vanes and a fixed diffuser.

43. The disk according to claim 37 wherein the turbine, wave rotor and compressor are part of a Brayton cycle engine which generates electricity.

44. The disk according to claim 37 wherein the wave rotor includes an array of channels which are periodically ported to high and low pressure ducts to create air flow expansion waves to directly transfer energy between fluids in the wave rotor.

45. The disk according to claim 37 wherein the compressor, wave rotor and turbine all have a thickness of four millimeters or less.

46. The disk according to claim 37 wherein the compressor, wave rotor and turbine all have a thickness of ten millimeters or less.

47. The disk according to claim 37 wherein the thrust-to-weight ratio is at least 100:1 in at least one operating condition.

48. The disk according to claim 37 wherein the wave rotor further comprises axially parallel channels periodically ported to high and low pressure areas to create expansion waves, air flowing from the compressor to the wave rotor, and combustion gases flowing from the wave rotor to the turbine.

49. The disk according to claim 37 wherein the wave rotor further comprises multiple channels which rotate around a central axis, at least a majority of the channels having a curved elongated orientation.

50. The disk according to claim 37 wherein the wave rotor is a radial wave rotor.

51. An engine disk comprising:
a compressor;
a wave rotor; and
a turbine;
wherein the compressor, wave rotor and turbine are in selective fluid communication; and
wherein the wave rotor rotates a disk which includes the compressor and turbine.

52. The disk according to claim 51 wherein the compressor is on a surface opposite to the turbine.

53. The disk according to claim 51 wherein the wave rotor comprises silicone, silicone carbide, silicone nitrate or combinations thereof.

54. The disk according to claim 51 further comprising air flowing through an intake inlet with the assistance of the compressor, then entering a wave rotor port, thereafter flowing into the wave rotor and a combustion chamber where fuel is added and ignited, whereafter burnt gas exits another wave rotor port, and the burnt gas then passing through the turbine.

55. The disk according to claim 51 wherein the wave rotor is an axial wave rotor made of a MEMS material.

56. The disk according to claim 51 further comprising spinning vanes of the compressor being part of the same wafer layer as turbine guide vanes and a fixed diffuser.

57. The disk according to claim 51 wherein the turbine, wave rotor and compressor are part of a Brayton cycle engine which generates electricity.

58. The disk according to claim 51 wherein the compressor, wave rotor and turbine all have a thickness of four millimeters or less.

59. The disk according to claim 51 wherein the compressor, wave rotor and turbine all have a thickness of four millimeters or less.

60. The disk according to claim 51 wherein the compressor, wave rotor and turbine all have a thickness of ten millimeters or less.

61. The disk according to claim 51 wherein the thrust-to-weight ratio is 100:1 in at least one operating condition.

62. The disk according to claim 51 wherein the wave rotor further comprises axially parallel channels periodically ported to high and low pressure areas to create expansion waves, air flowing from the compressor to the wave rotor, and combustion gases flowing from the wave rotor to the turbine.

63. The disk according to claim 51 wherein the wave rotor further comprises multiple channels which rotate around a central axis, at least a majority of the channels having a curved elongated orientation.

64. The disk according to claim 51 wherein the wave rotor is a radial wave rotor.

65. An engine disk comprising:
a compressor including vanes;
a wave rotor including multiple channels which are periodically ported to high and low pressure ducts to create air flow expansion waves;
a turbine;
air flowing from the compressor to the wave rotor; and
combustion gases flowing from the wave rotor to the turbine;
the compressor, wave rotor and turbine all having an outer dimension of twenty millimeters or less.

66. The disk according to claim 65 wherein the compressor, wave rotor and turbine all have a thickness of four millimeters or less.

67. The disk according to claim 65 wherein the compressor, wave rotor and turbine all have a thickness of ten millimeters or less.

68. The disk according to claim 65 wherein the thrust-to-weight ration is about 30:1 in at least one operating condition.

69. The disk according to claim 65 further comprising spinning vanes of the compressor being part of the same wafer layer as turbine guide vanes and a fixed diffuser.

70. The disk according to claim 65 wherein the turbine, wave rotor and compressor are part of a small Brayton cycle engine which generates electricity.

71. The disk according to claim 65 wherein the wave rotor is a MEMS material.

72. An engine disk comprising:
a compressor including vanes;
a wave rotor including multiple channels which are periodically ported to high and low pressure ducts to create air flow expansion waves;
a turbine;
air flowing from the compressor to the wave rotor; and
combustion gases flowing from the wave rotor to the turbine;
the compressor, wave rotor and turbine all having an outer dimension of twenty millimeters or less; and
wherein the wave rotor, compressor and turbine are all part of the same disk layer, and the wave rotor rotates the compressor and turbine.

73. The disk according to claim 72 wherein the compressor, wave rotor and turbine all have a thickness of four millimeters or less.

74. The disk according to claim 72 wherein the compressor, wave rotor and turbine all have a thickness of ten millimeters or less.

75. The disk according to claim 72 wherein the thrust-to-weight ratio is 100:1 in at least one operating condition.

76. The disk according to claim 72 wherein the turbine, wave rotor and compressor are part of a Brayton cycle engine which generates electricity.

77. The disk according to claim 72 wherein the wave rotor is a MEMS material.

78. The disk according to claim 72 wherein the disk has a diameter less than one centimeter.

79. The disk according to claim 72 wherein each of the channels has a curved elongated orientation.

80. The disk according to claim 72 wherein the wave rotor is a radial wave rotor.

81. The disk according to claim 72 wherein the wave rotor is an axial wave rotor made of a MEMS material.

82. A engine disk comprising:
a compressor;
a wave rotor having a channel length less than twenty millimeters;
a first stationary member comprising an inlet port and a first wave rotor end plate;
a second stationary member comprising a second wave rotor end plate and an exhaust port;
at least one of the compressor and wave rotor operably rotating between the stationary members.

83. The engine according to claim 82 wherein the wave rotor and compressor are part of a small Brayton cycle engine which generates electricity.

84. The engine according to claim 82 further comprising a turbine, wherein the wave rotor further comprises axially parallel channels periodically ported to high and low pressure areas to create expansion waves, air flowing from the compressor to the wave rotor, and combustion gases flowing from the wave rotor to the turbine.

85. The engine according to claim 82 wherein the disk has a diameter less than one centimeter.

86. The engine according to claim 82 wherein the wave rotor comprises silicone, silicone carbide, silicone nitrate or combinations thereof.

87. The engine according to claim 82 wherein the wave rotor further comprises multiple channels which rotate around a central axis, at least a majority of the channels having a curved elongated orientation.

88. The engine according to claim 82 wherein the wave rotor is a radial wave rotor.

89. The engine according to claim 82 wherein the wave rotor is an axial wave rotor etched in a MEMS material.

90. The engine according to claim 82 wherein fluid flows into the wave rotor at a subsonic speed and the wave rotor rotates at a maximum of 100 rpm.

* * * * *

UNITED STATES PATENT AND TRADEMARK OFFICE
CERTIFICATE OF CORRECTION

PATENT NO. : 7,934,368 B2  
APPLICATION NO. : 11/631923  
DATED : May 3, 2011  
INVENTOR(S) : Norbert Müller et al.

Page 1 of 1

It is certified that error appears in the above-identified patent and that said Letters Patent is hereby corrected as shown below:

In the Specifications:

Column 6, line 43, after "can" insert --be--.

Column 7, line 56, after "shown" insert --in--.

Column 9, line 8, "is" should be --it--.

Column 11, line 7, after "kJ/kgK" insert --)--.

Column 14, line 7, "materials" should be --material--.

Column 14, line 50, "coatings" should be --coating--.

Column 15, line 21, "materials" should be --material--.

Column 15, line 24, "materials" should be --material--.

Column 17, line 17, after "or" insert --more--.

In the Claims:

Column 18, line 18, Claim 8, "ration" should be --ratio--.

Column 21, line 47, Claim 68, "ration" should be --ratio--.

Signed and Sealed this  
Eleventh Day of June, 2013

Teresa Stanek Rea  
*Acting Director of the United States Patent and Trademark Office*